(12) United States Patent
Charles

(10) Patent No.: US 11,419,327 B2
(45) Date of Patent: Aug. 23, 2022

(54) SCENT DISPERSING DEVICE AND SYSTEM FOR HUNTING, MOSQUITO CONTROL, AND OTHER APPLICATIONS

(71) Applicant: Kerry Charles, Muncie, IN (US)

(72) Inventor: Kerry Charles, Muncie, IN (US)

( * ) Notice: Subject to any disclaimer, the term of this patent is extended or adjusted under 35 U.S.C. 154(b) by 527 days.

(21) Appl. No.: 15/615,611

(22) Filed: Jun. 6, 2017

(65) Prior Publication Data

US 2017/0347642 A1     Dec. 7, 2017

Related U.S. Application Data

(60) Provisional application No. 62/346,409, filed on Jun. 6, 2016.

(51) Int. Cl.
*A01M 31/00* (2006.01)
*A01M 29/12* (2011.01)
*A01K 29/00* (2006.01)

(52) U.S. Cl.
CPC .......... *A01M 31/008* (2013.01); *A01M 29/12* (2013.01); *A01K 29/00* (2013.01); *A01M 2200/012* (2013.01)

(58) Field of Classification Search
CPC ............... A01M 31/008; A01M 29/12; A01M 2200/012; A01K 29/00
See application file for complete search history.

(56) References Cited

U.S. PATENT DOCUMENTS

| | | | |
|---|---|---|---|
| 4,781,895 A | * | 11/1988 | Spector ............... A01M 1/2088 261/DIG. 88 |
| 4,953,763 A | | 9/1990 | Kierum et al. |
| 5,307,584 A | | 5/1994 | Jarvis |
| 5,544,812 A | * | 8/1996 | Torres ....................... A61L 9/12 239/55 |
| 5,857,281 A | | 1/1999 | Bergquist et al. |
| 5,914,119 A | | 6/1999 | Dawson |
| 6,083,804 A | | 7/2000 | Cuerrier |
| 6,241,161 B1 | * | 6/2001 | Corbett ............... A01M 31/008 222/187 |
| 6,550,689 B1 | | 4/2003 | Hoyes et al. |
| 6,648,239 B1 | * | 11/2003 | Myny ................. A01M 31/008 239/34 |

(Continued)

FOREIGN PATENT DOCUMENTS

CA     2436205 A1 *  2/2004  .......... A01M 31/008
CA     2845065 A1 *  5/2014  ............... F41H 3/00

*Primary Examiner* — Regina M Yoo
(74) *Attorney, Agent, or Firm* — Ritchison Law Offices, PC; John D Ritchison

(57) ABSTRACT

A scent dispersing device for hunting and alternatively mosquito control. It is an animal scent lure and scent holder used by hunters to secure a scent element to a specific area to attract wild animals such as deer. It is made of a top cap with apertures; a bottom cap with apertures; a main body of various sizes with apertures; a way for removably connecting main body to the top and bottom caps; a scent stick with incense and with a holder and base; a way for protecting the scent stick; a manner for hanging this in trees; and a way for removably connecting the manner for hanging to the top cap activating the scent stick. The device is first attached to the trees and then the apertures of the caps and body are adjusted to create a chimney effect for releasing the scent or mosquito control.

15 Claims, 21 Drawing Sheets

(56) References Cited

U.S. PATENT DOCUMENTS

| | | | |
|---|---|---|---|
| 6,745,950 B1* | 6/2004 | Longo | A01M 31/008 239/145 |
| 7,690,540 B1 | 4/2010 | Owens | |
| 8,888,550 B1 | 11/2014 | Conner | |
| 8,919,662 B2* | 12/2014 | Sherwood | A01M 1/2055 239/6 |
| 8,938,905 B1 | 1/2015 | Moore | |
| 9,289,529 B2 | 3/2016 | Buck | |
| 2006/0088500 A1 | 4/2006 | Cole | |
| 2008/0099581 A1 | 5/2008 | Modlin et al. | |
| 2008/0244954 A1 | 10/2008 | Shannon | |
| 2011/0030266 A1* | 2/2011 | Roy | A01M 1/08 43/113 |
| 2011/0278371 A1 | 11/2011 | Rydbom | |
| 2015/0136872 A1* | 5/2015 | Sherwood | A01M 1/2055 239/54 |
| 2015/0251809 A1* | 9/2015 | Jasin | F41H 3/00 220/8 |
| 2017/0027158 A1* | 2/2017 | Slangan | A01M 31/008 |

\* cited by examiner

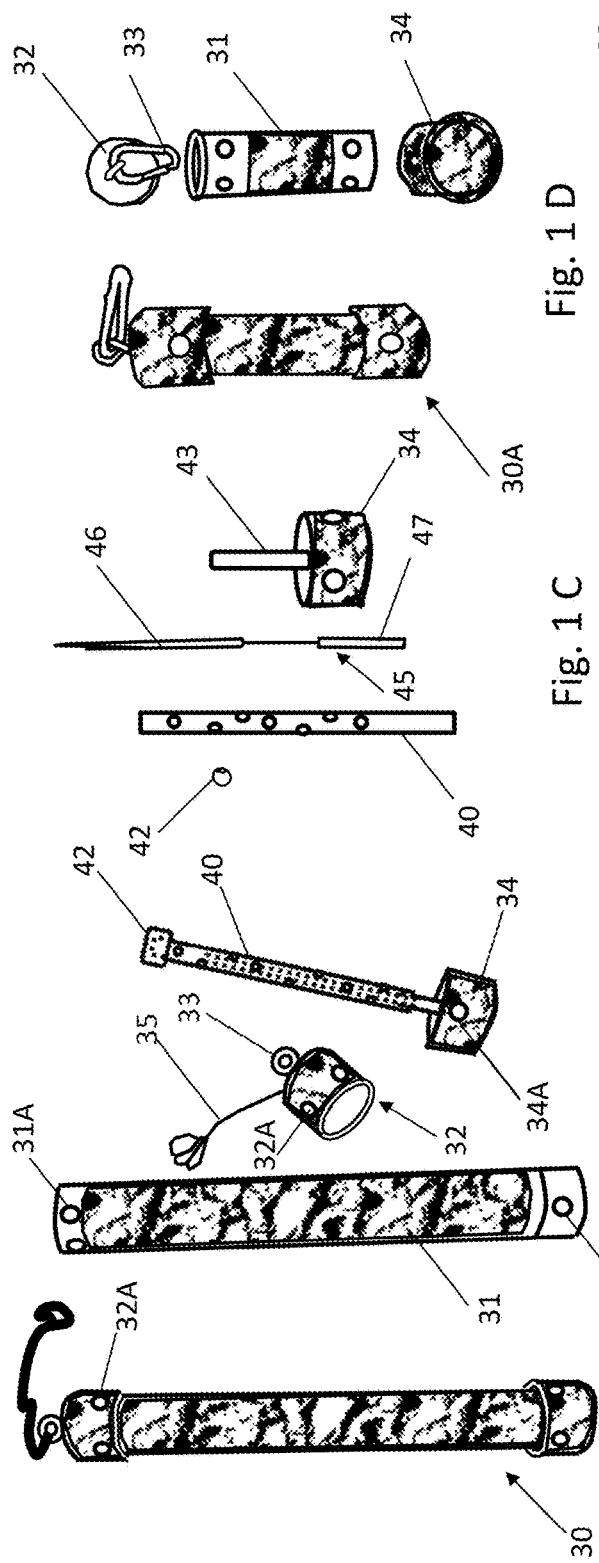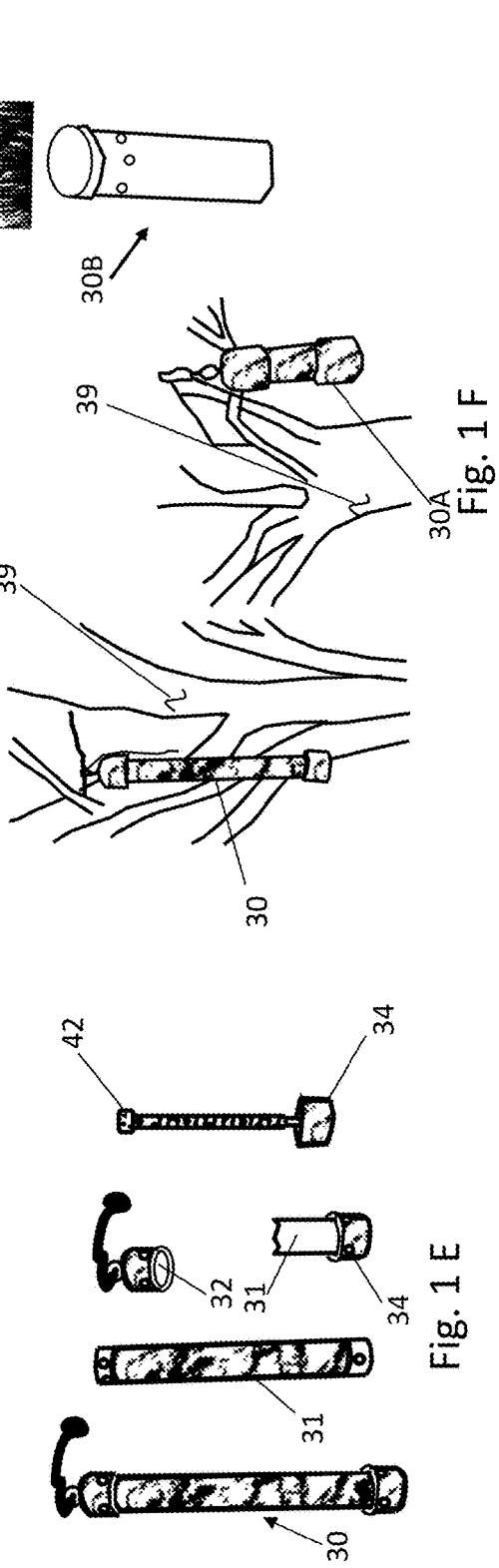

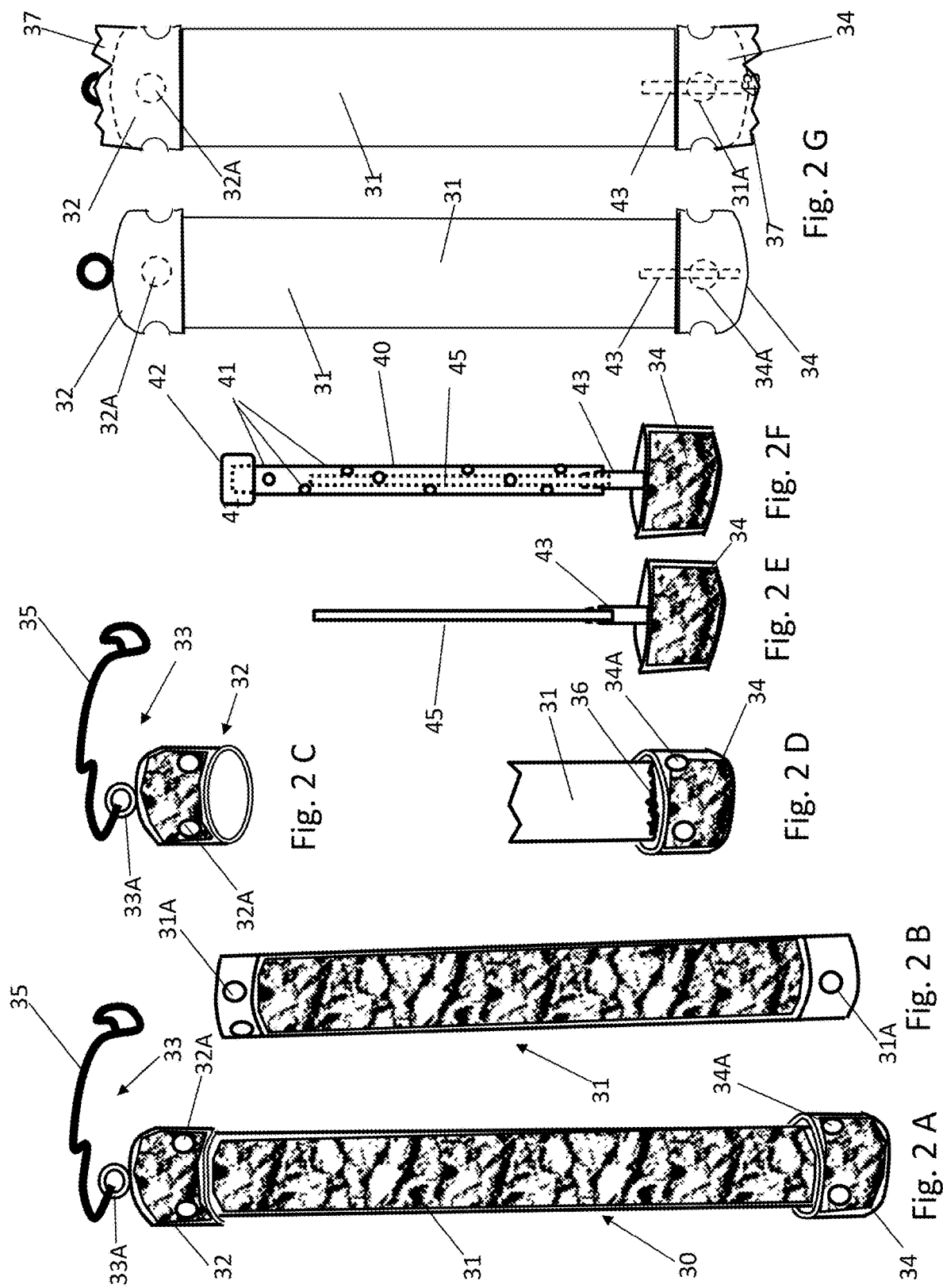

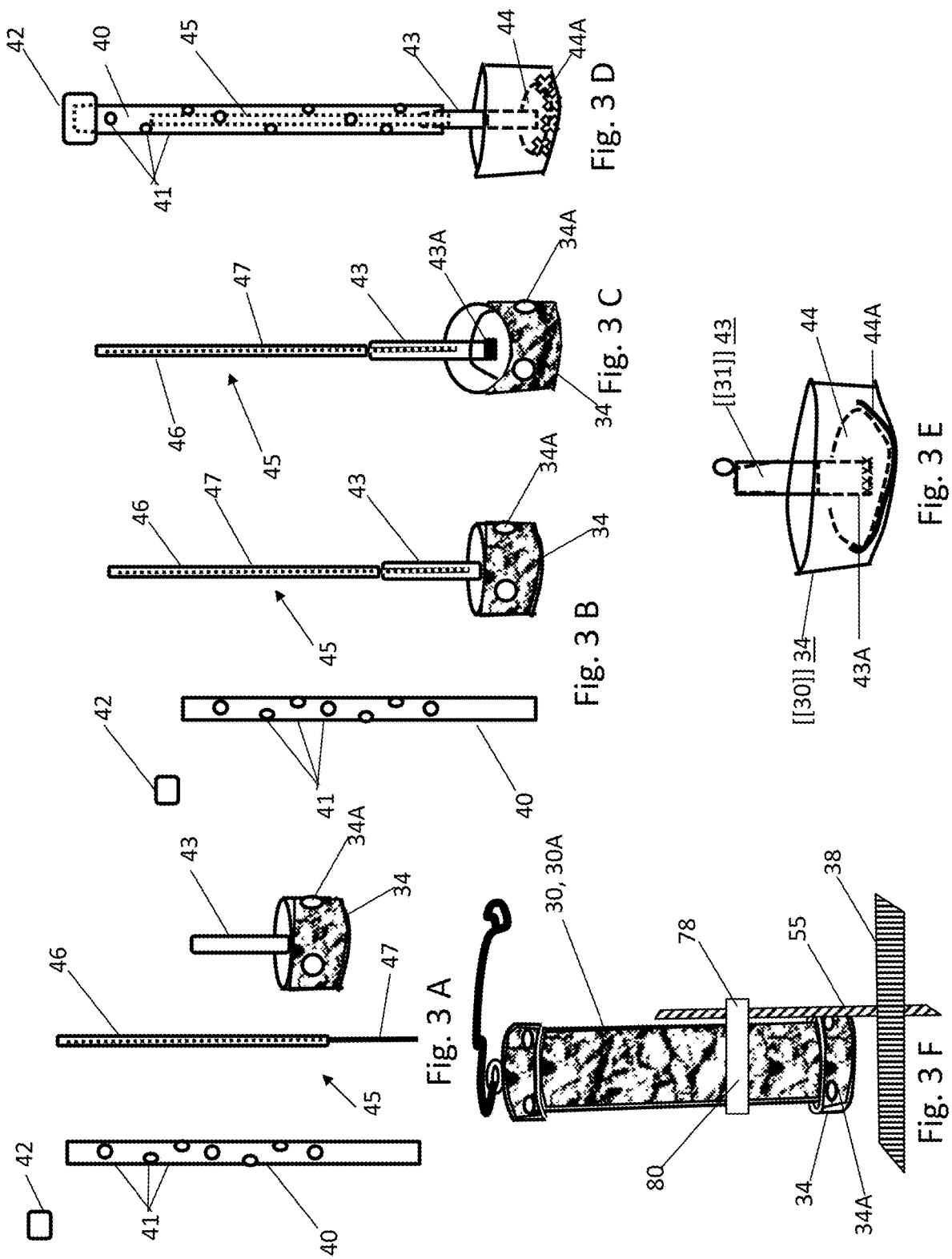

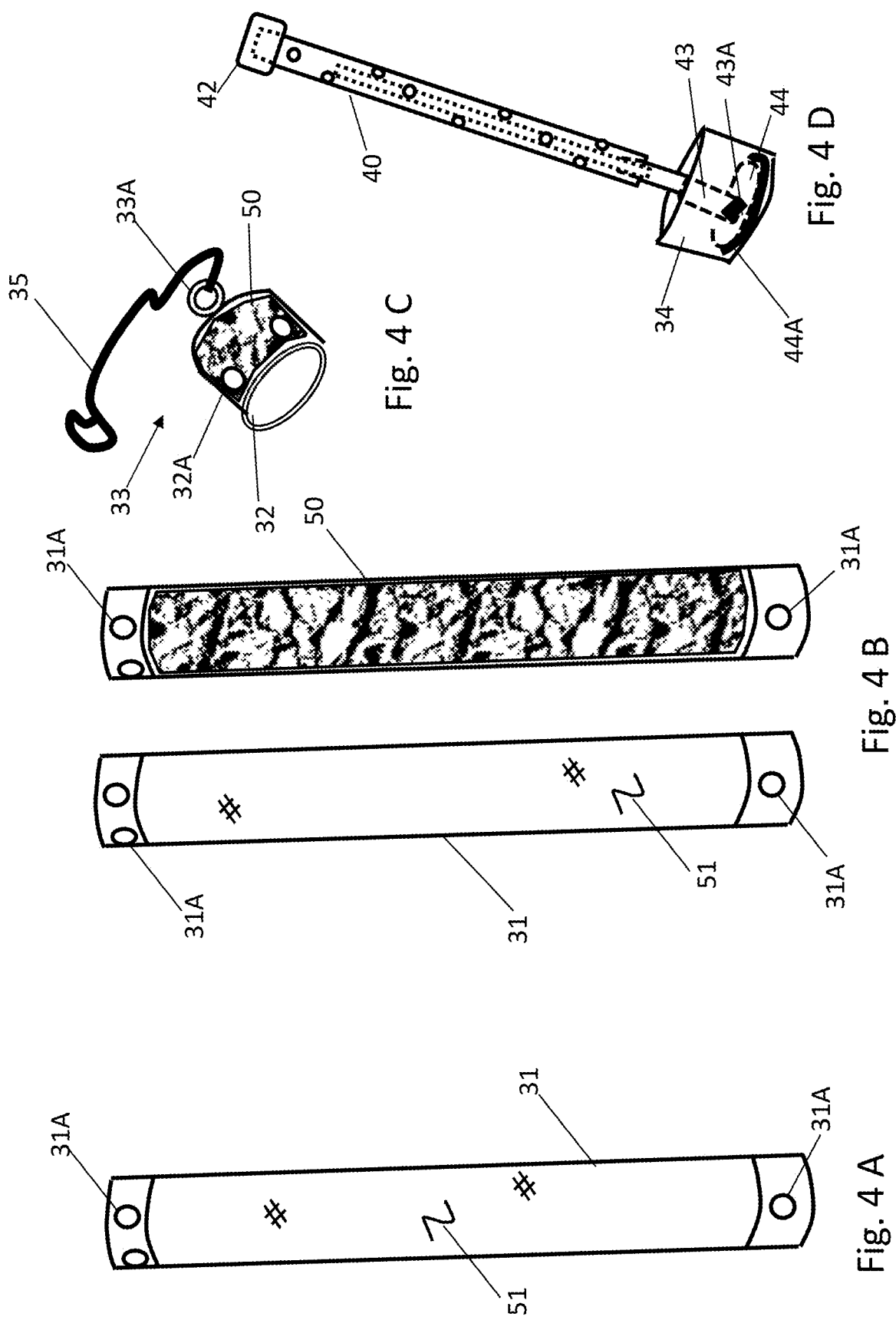

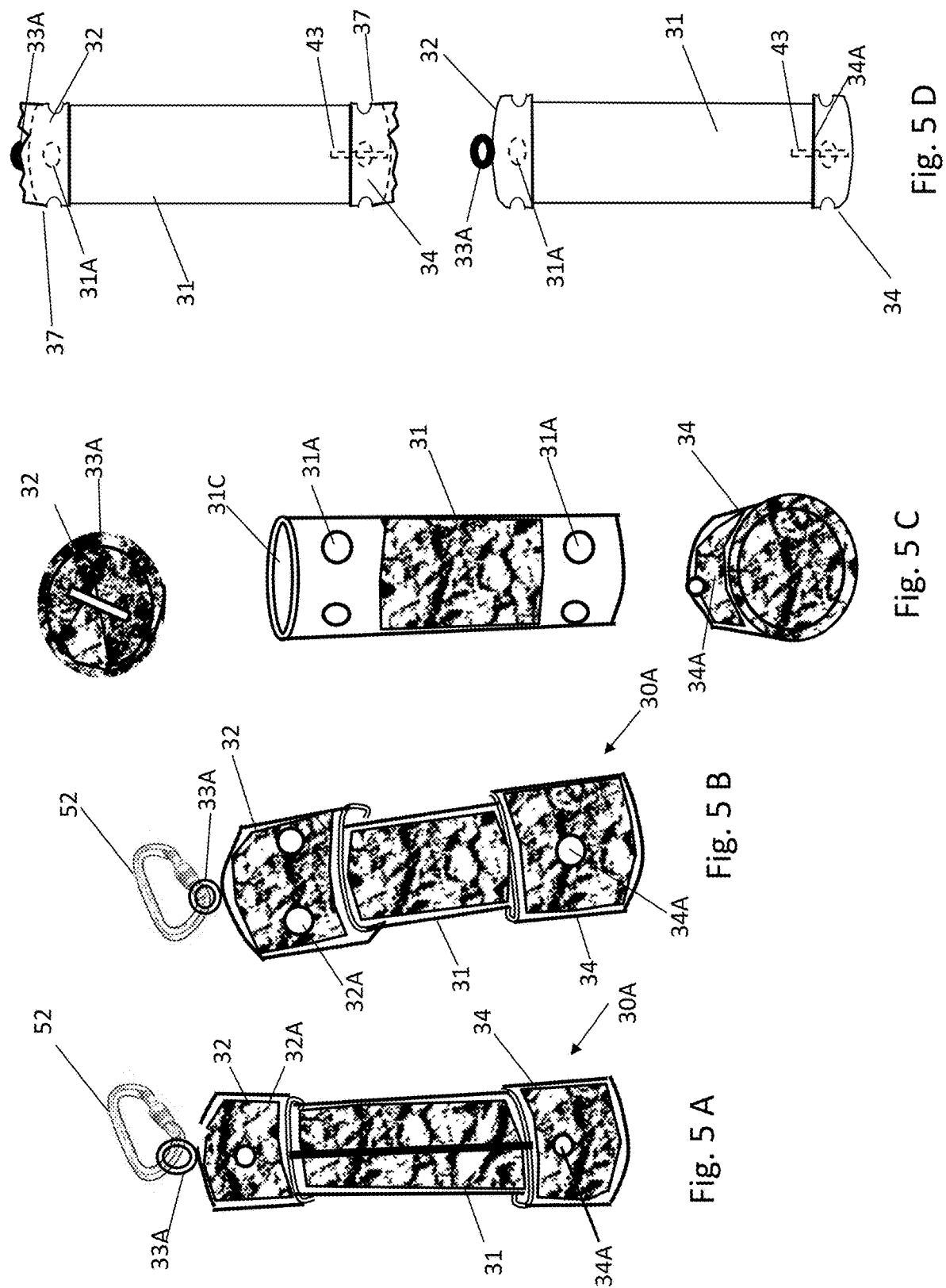

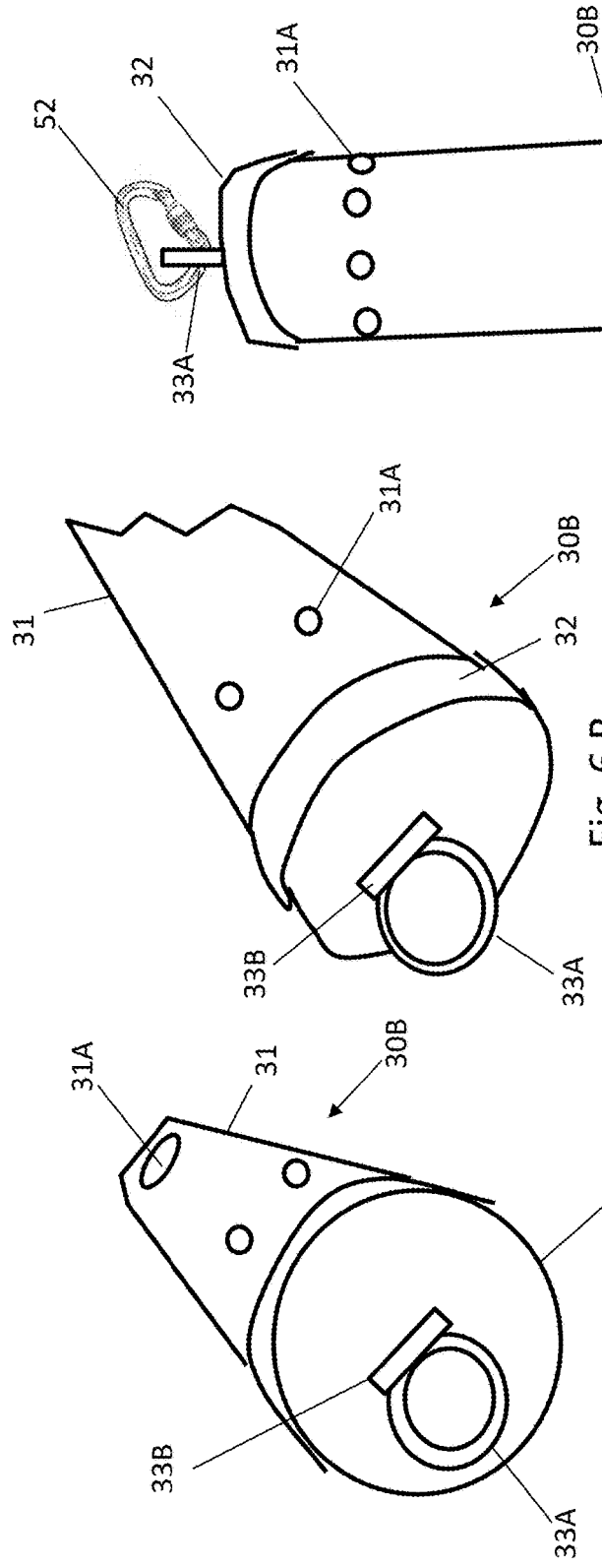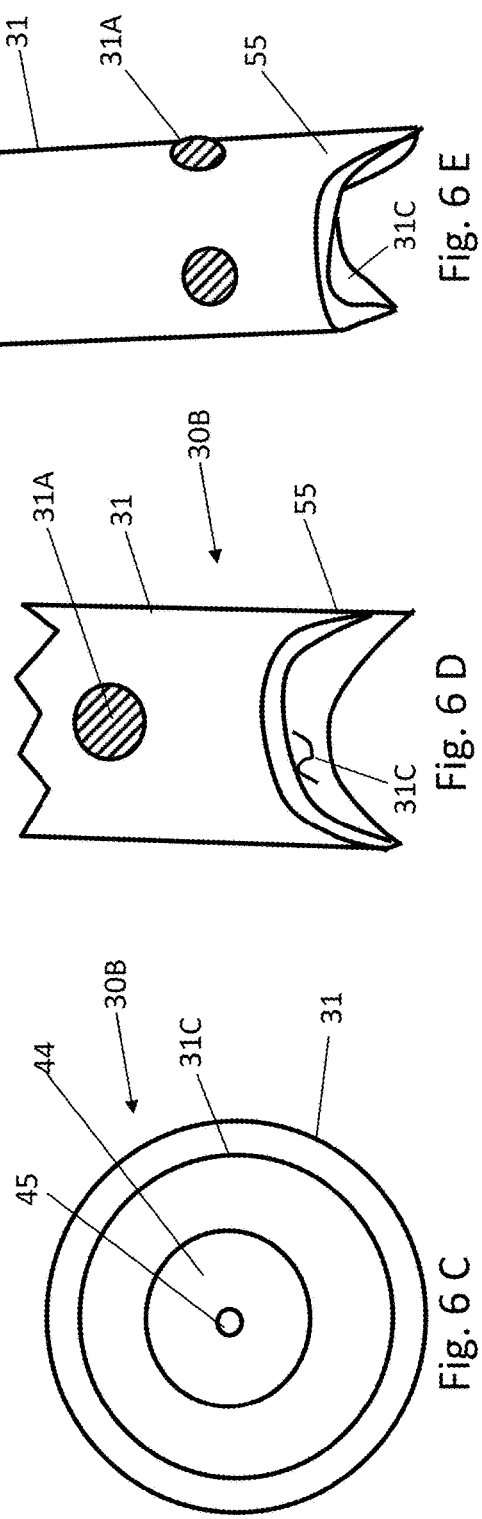

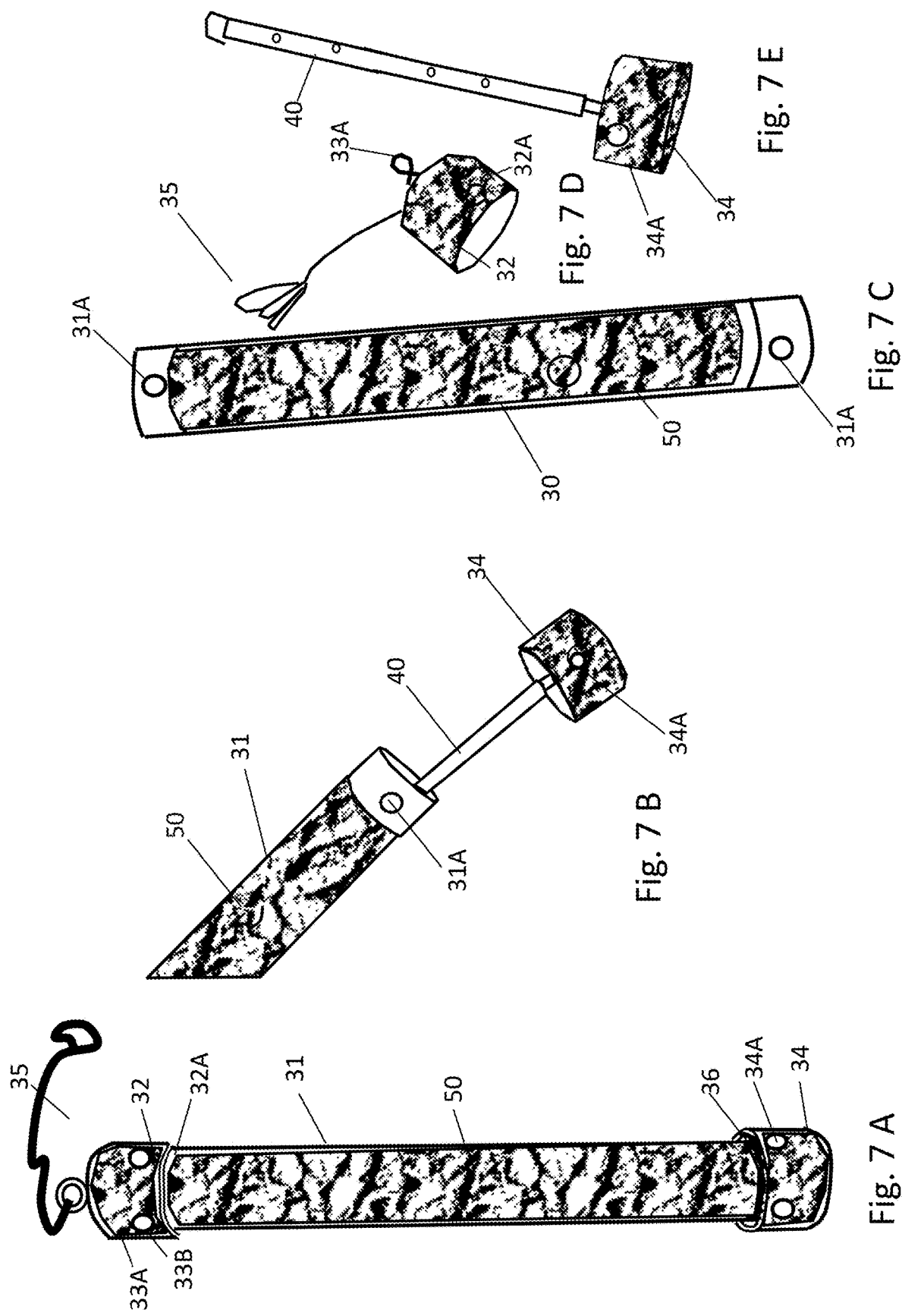

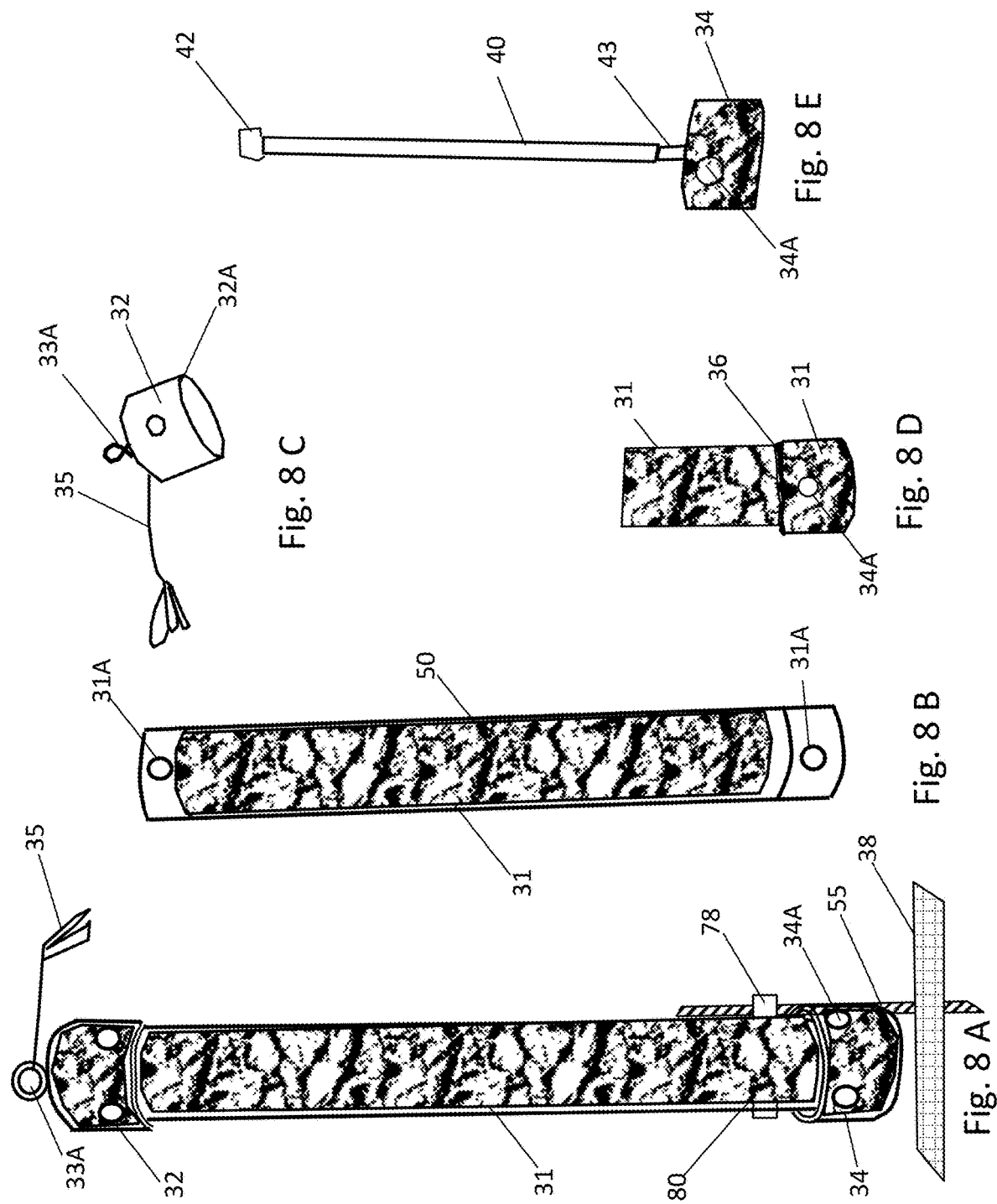

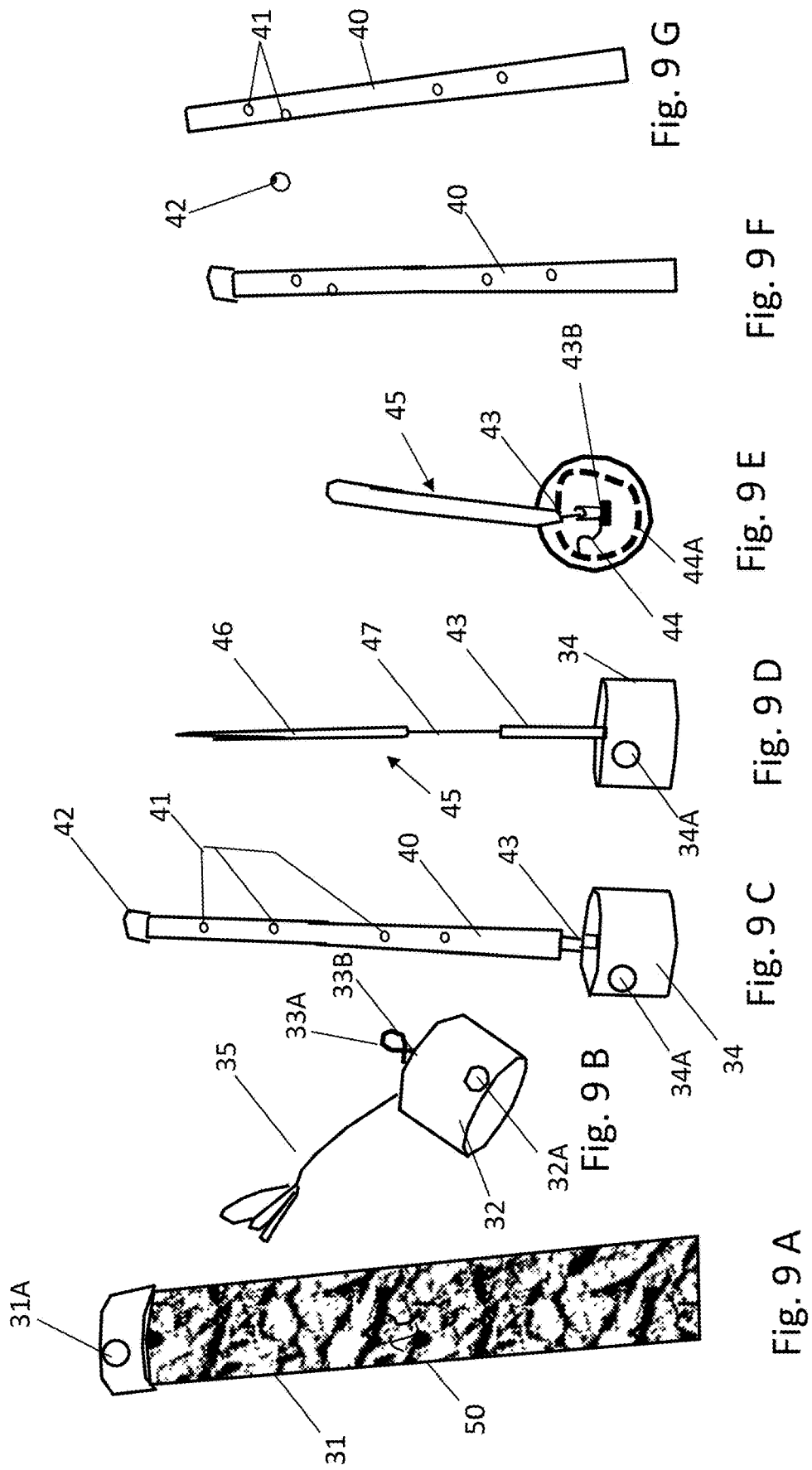

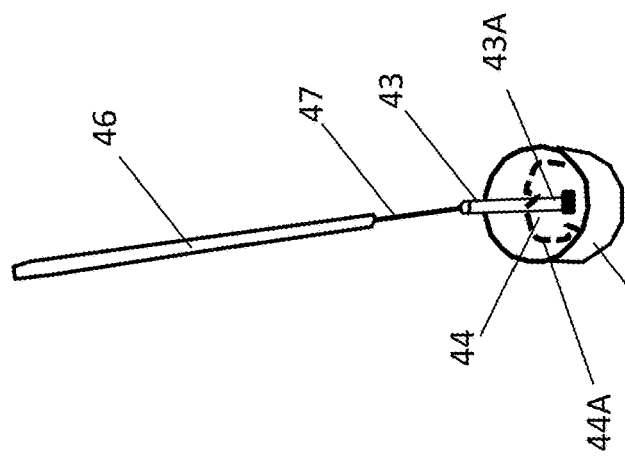
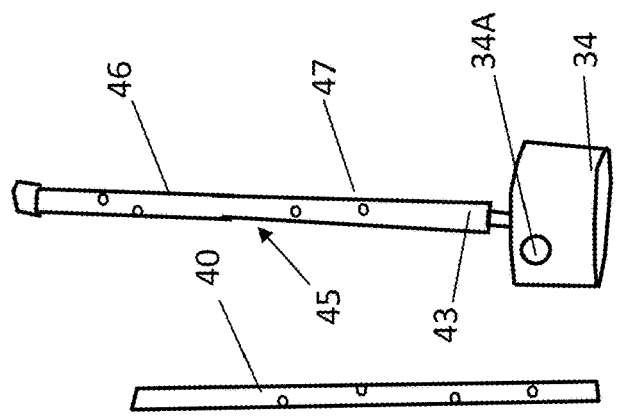
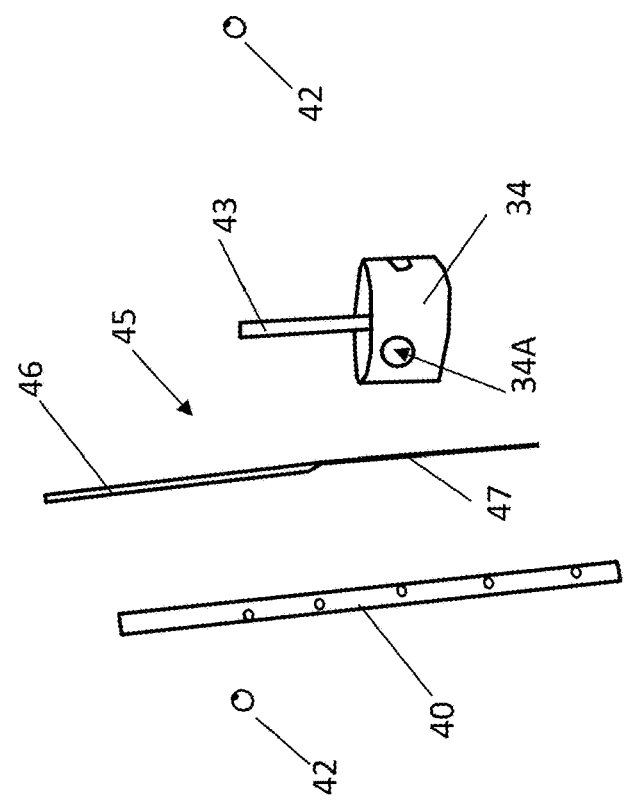
Fig. 10 C
Fig. 10 B
Fig. 10 A

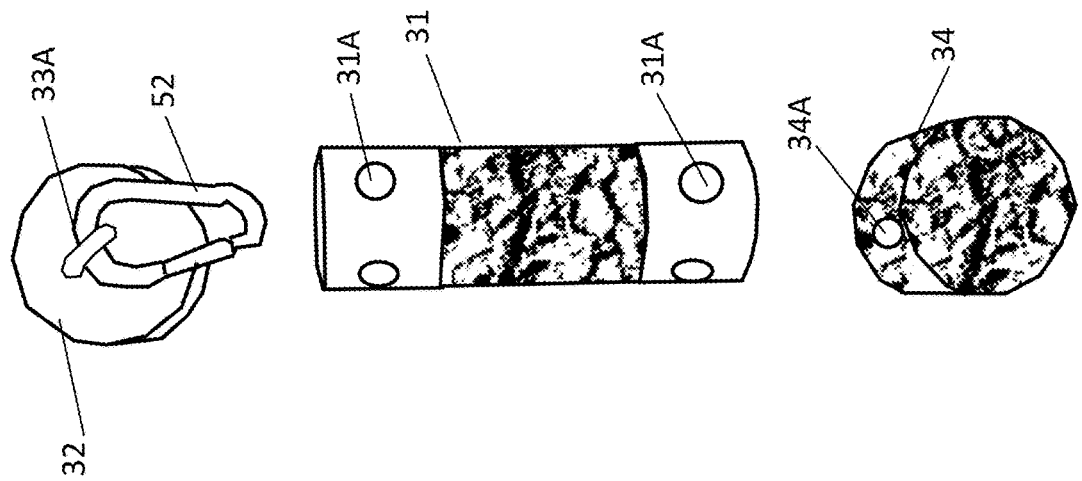
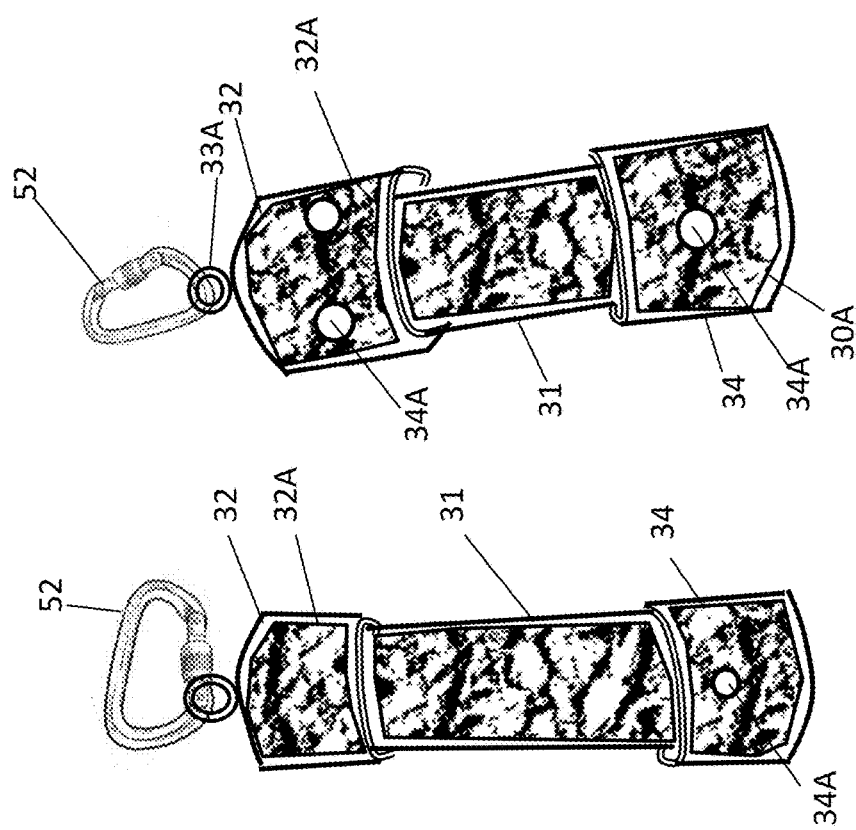
Fig. 13 A
Fig. 13 B
Fig. 13 C

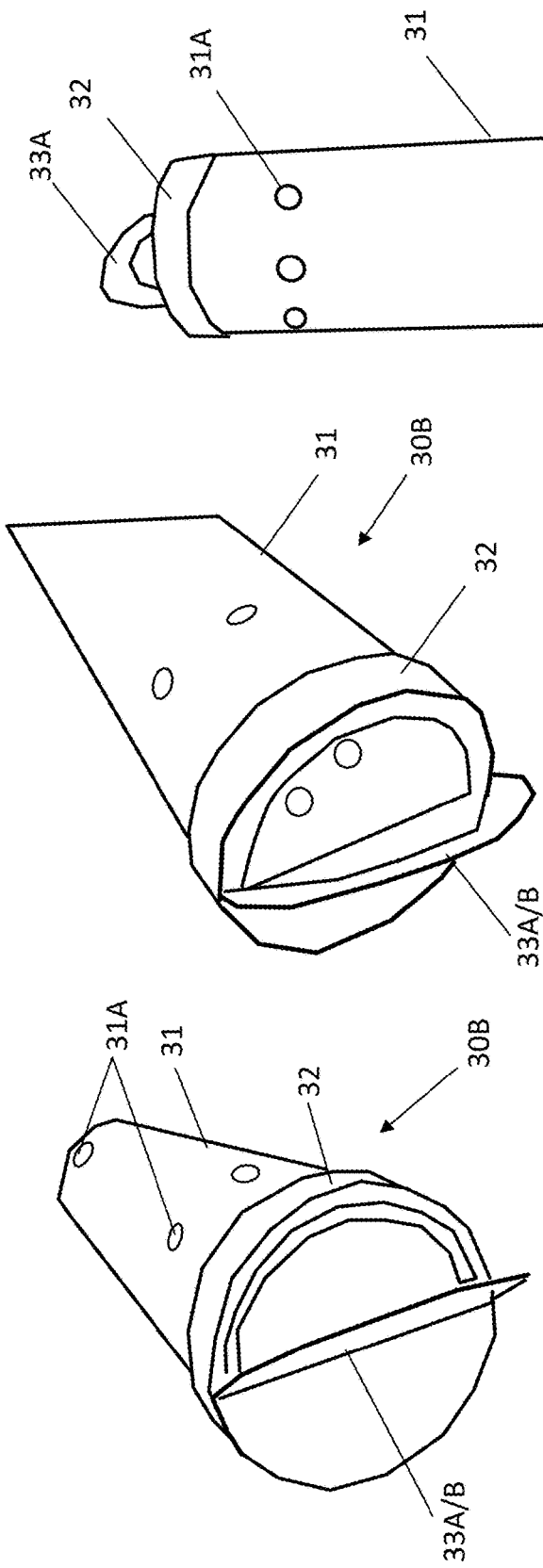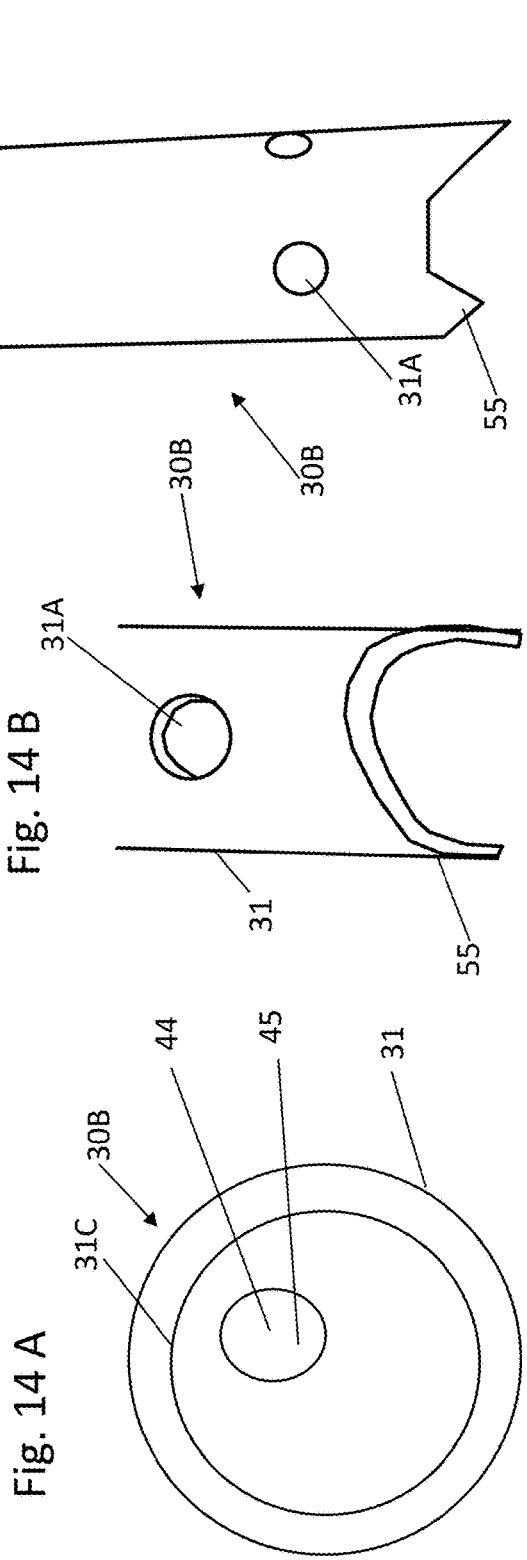

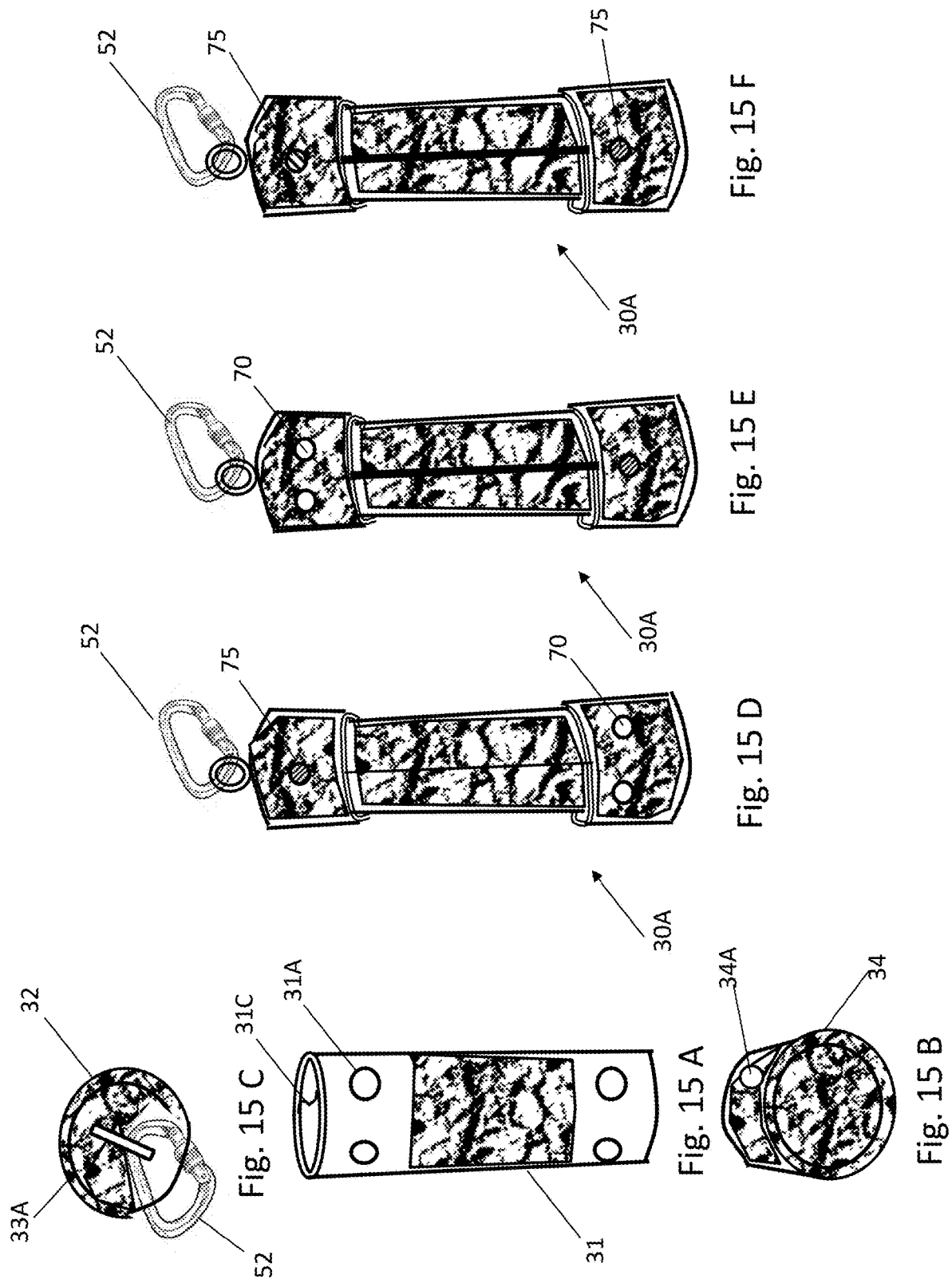

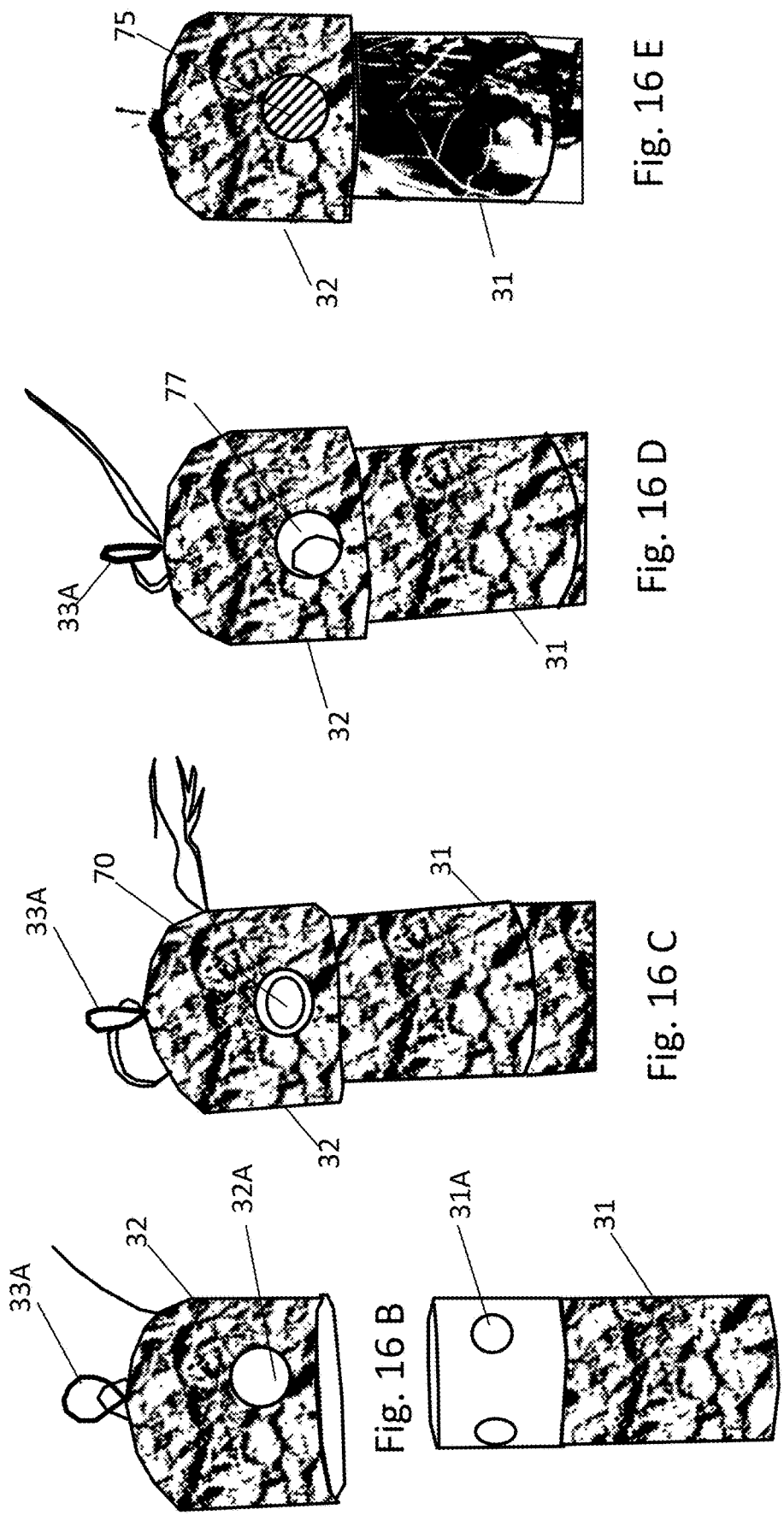

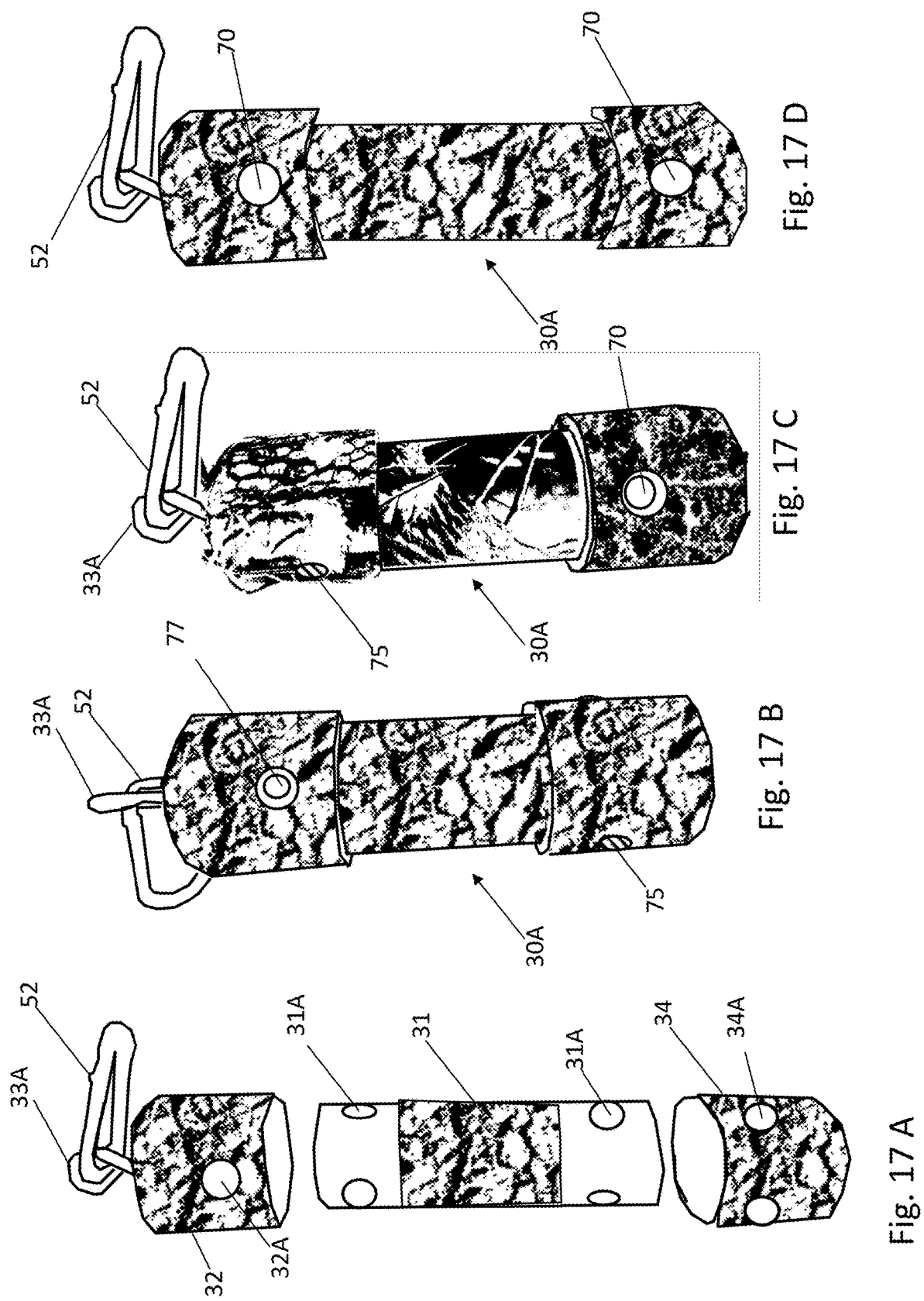

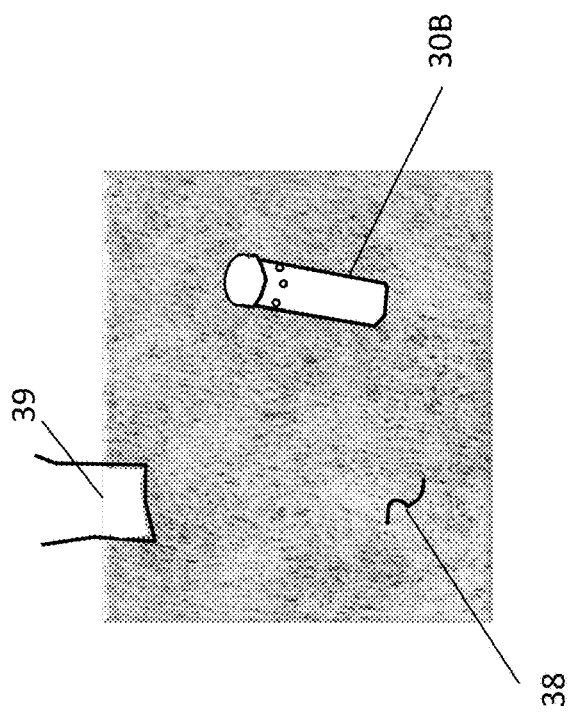
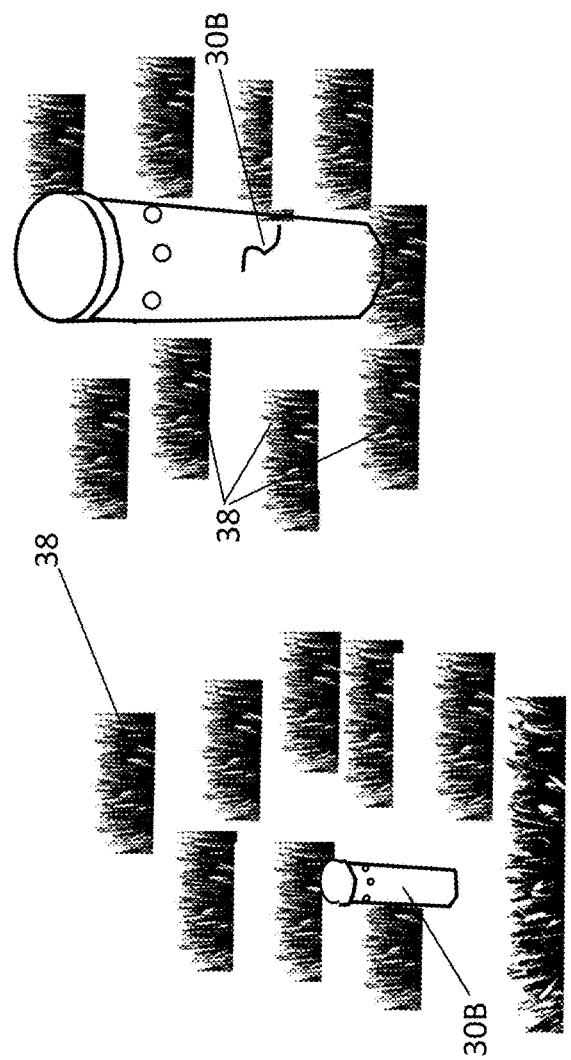
Fig. 18 C
Fig. 18 B
Fig. 18 A

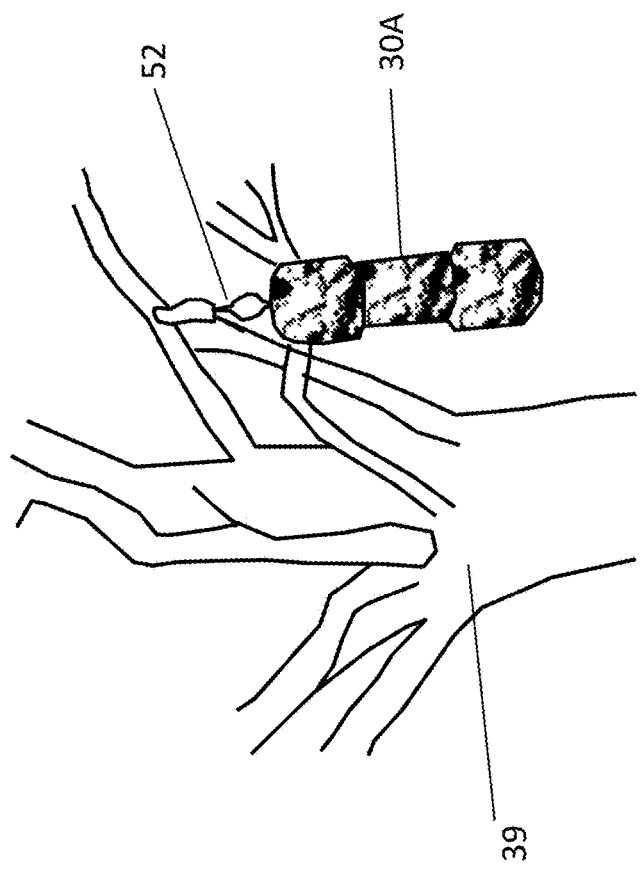
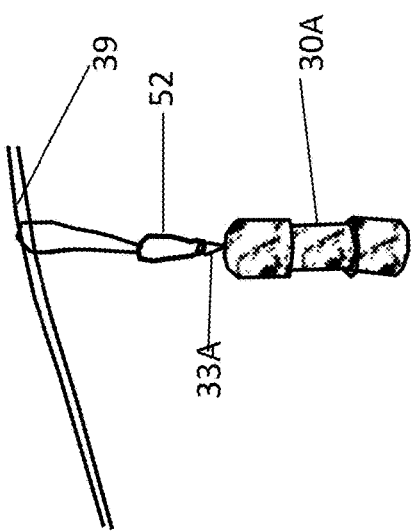
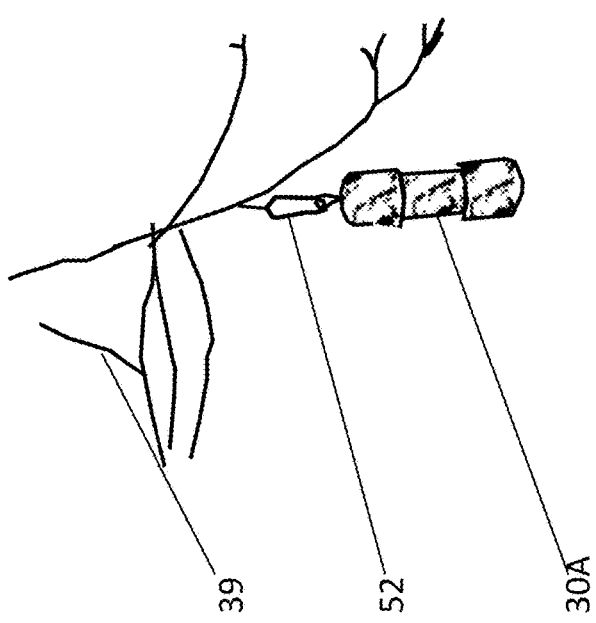
Fig. 20 A
Fig. 20 B
Fig. 20 C

SCENT DISPERSING DEVICE AND SYSTEM FOR HUNTING, MOSQUITO CONTROL, AND OTHER APPLICATIONS

CROSS-REFERENCE TO RELATED APPLICATIONS

This application claims the benefit of U.S. Provisional Patent Application with Ser. No. 62/346,409 filed Jun. 6, 2016, by Kerry Charles and entitled "Special scent dispersing device and system for hunting and other applications".

FIELD OF INVENTION

This invention relates to a scent dispersing device and system for hunting, mosquito control, and other applications. This invention relates generally to animal scent lure systems and devices and, more specifically, to a scent element holder device that is used by hunters to removably secure a scent element to a hunting area, for example, to attract wild animals such as deer. The invention relates to hunting and wildlife accessories and, more particularly, to game such as deer attracting aids. In general, the present invention relates to an animal attractant and or cover scent dispersal apparatus and system associated with hunting. More particularly, the present invention relates to a new and improved animal attractant device, system and method of using the same for utilizing airborne scents to carry an animal attractant and or cover scent throughout a desired location as desired. It is understood that the current invention may also be used to disperse desired odors and or chemicals for non-hunting applications.

Use of scents while hunting is an effective way to make a hunter more successful. Scents are available commercially that attract wild game, and that mask a hunter's scent from wild game's keen sense of smell. This invention relates to hunting, and more particularly to a scent dispersing apparatus. The present invention relates to an animal scent lure and particularly to an incense that contains wild game scents such as deer estrus scent, which is released into the air by providing incense aromas, thereby a attracting a species of animal in the game and/or deer family.

FEDERALLY SPONSORED RESEARCH

None.

SEQUENCE LISTING OR PROGRAM

None.

BACKGROUND

Field of Invention and Prior Art

As far as known, there are no Scent dispersing device and system for hunting, mosquito control, and other applications or the like. It is believed that this product is unique in its design and technologies.

Background

In general, hunters of deer and other wild game animals will typically utilize some type of animal lure device to lure game animals, such as deer, to a hunting area. One type of lure commonly employed by hunters includes a scented substance having an odor that serves as an animal attractant. These scents typically include urine from the hunted animal, or estrus scent, and such scented lures are typically available in liquid concentrated form. These lure scents may be dispensed in the hunting area in various manners.

For example, the scent may be stored in a sealed container and dispensed from the container at the hunt site, wherein the scent is applied directly to the boots of the hunter, or sprayed or otherwise applied onto some local object such as the ground, or a decoy, or some scent pad that is attached to a tree or branch, etc., in the hunting area. Alternatively, a scent container may contain a wick that is stored in the container and soaked in the scent, whereby the wick is deployed from the container and suspended from a tree or bush at the hunt site.

Other animal lure devices commonly used by hunters include decoy devices. For instance, deer hunters typically use a variety of three-dimensional deer decoys to attract the attention of live Whitetail deer, and lure the deer in close proximity for an ideal, ethical shot, by using sight. When a whitetail deer sees a deer decoy, it believes the decoy is another whitetail deer and to confirm the sighting, the deer will start approaching the decoy to scent check the decoy for verification. A whitetail deer will scent check by putting its nose close to what is known as a "tarsal" gland. All deer have two tarsal glands, each of which being located on the inside rear legs of the deer at the knuckle/joint. The tarsal glands are typically 2-3 inches by 2-3 inches in area (i.e., in the range of about 4 to 9 square inches in area) depending on the size and age of the deer.

The tarsal gland is the most important gland to white tailed deer. The tarsal gland is used by a deer to recognize another deer and deer often sniff each other's tarsal glands. By doing so, a deer can determine the sex, dominant and social status, and reproductive condition of another deer in the herd. In particular, bucks rely on their nose to identify possible threats, such as a hunter or a predator, or to hunt for a receptive doe during the rut, and to identify one particular deer from another. All deer, bucks and does, adults and fawns, urinate onto the tarsal gland in a behavior called "rub urination." The urine that remains on the gland undergoes some reactions with the air and with bacteria to produce the gland's characteristic smell. Deer urinate on these glands at all times of the year. Typically, the urine is licked off the gland.

However, during the breeding season, the males and primarily dominant or mature males, urinate onto the tarsal gland more frequently, and do not lick the excess urine off the gland, which stains the gland dark and gives the buck a rutting odor. All deer including bucks and does use the same behavior and gland for identification purposes. However, during the rut, the activity surrounding the identifying gland is greatly increased. Does will have their glands give off the estrous odor to signify to a buck at what stage they are ready for breeding. Does will identify their fawns through the smell of their tarsal gland. Bucks use the gland to advertise their dominant status and breeding condition, both to other bucks and does.

It is well known that hunting and observing deer are popular activities. It is also known that to see deer, stalking techniques in which the hunter or observer tries to approach the deer is extremely difficult since deer have keen senses for detecting predators. It is therefore often desirable to try luring deer or attracting them to a predetermined location for hunting or observing. Naturally attracting deer by providing, for example, a food plot near a hunting blind or observation blind is one common technique. However, food plots are typically large and a hunter or observer may not be able to readily see deer in certain portions of plots that are furthest from a blind.

Attempts have been made to attract deer to more specific locations than to general locations like food plots in order to increase the likelihood that the hunter or observer will have a clear line of sight to the deer at such specific location. These attempts include providing bait, minerals, and artificial scents to attract the deer to specific locations. These techniques can be expensive, time consuming, and may not be permitted in certain hunting or observing jurisdictions.

Game animals such as deer and the like are known to be attracted during mating season by certain scents classified as pheromones. In the case of a doe, the pheromone is contained in her urine which is sprinkled on the ground as a means of notifying a buck of her availability. Chemists and others have developed both artificial and natural scents which substantially duplicate the smell of doe-in-estrus urine. Such liquid scents are offered in small quantities and at high cost. Furthermore, game animals are sensitive to the odor of humans. Accordingly, hunters need to disguise their scent trail. In hunting deer, doe urine can be used for that purpose. A properly applied trail of doe urine, in addition to masking the hunter's scent, may also attract a buck towards the hunter who lies in wait.

One of the most common dispensers for liquid scent is a drag rag. For covering a trail with a drag rag, a hunter applies liquid scent to an absorbent pad which is then dragged behind him as he walks. By applying the scent in this manner, the scent rubs off on the trail and is applied in a manner simulating the natural method of scent presentation by a doe but as the rag is dragged, the scent is diluted. This results in a strong scent at the beginning and a weak scent trailing off at the end. If a buck crosses the hunter's trail, he is just as likely or more likely to head away from the hunter than towards him as the trail tapers stronger towards where the hunter began.

There are dispensers that hook to the branch of a tree for dripping liquid scent on the ground and there are dispensers that spray the liquid scent into the air where it dissipates quickly. These devices are obviously limited to relatively small dispersal patterns and therefore, have limited ability to be noticed by the desired game.

Wild game hunting is a popular sport, and hunters have devised numerous products and methods in order to improve the hunter's odds against the animal. While the hunter has superior fire power, animals possess a number of natural defenses that help to even the odds. One of these is a highly refined sense of smell that makes it possible for many animals to detect the presence of a human being at great distances, at least in a downwind direction. To overcome this disadvantage, a number of products have been developed that are designed to either cover the scent of a human being or to actually provide an attractive smell to an animal, such as a deer. These substances may include one or a combination of natural and/or synthetic animal urine or natural or synthetic aromatic substances that simulate fruits or vegetables or other things to which a deer or other animals may be attracted. Some of these products work, at least to some extent, but they generally have limited effectiveness.

One of the problems with existing products on the market is that the smell does not carry well enough or far enough or last long enough to provide maximum beneficial effect. One way of dispersing the aromatic substance is to dissolve it in a highly volatile liquid such as alcohol and then permit the alcohol to evaporate. The rate of evaporation can be increased by heating the liquid. Evaporation, however, is dependent on temperature, with evaporation occurring much more slowly at cold temperatures. Rainy weather also impairs evaporation. Wind, another factor, can also vary the rate of evaporation. Under most circumstances, evaporation occurs too slowly for maximum beneficial effect.

Conventional wisdom is that deer and other animals react highly negatively to the scent of a human being and any other scent indicative of the presence of a human being. Thus, while prior liquid scents have been heated, they have not been dispersed by burning the carrier.

The above discussion is not to be considered exhaustive. It does, however, demonstrate that a need exists for a new and improved scent dispersing system over the known prior art devices that have had very little changes since the conception of the same. The consuming industry is looking for solutions, methods, and systems to address these needs and there is an obvious need to fill the gap where the prior art has failed. What is needed is an apparatus, system and method to address these shortcomings in the prior art while providing a superior design. Thus, there is a need for a new and improved scent delivery system. The current invention provides a superior product where the prior art fails. The object of the present invention is to provide an improved animal lure and cover scent that disperses broadly and widely in any temperature condition and provides a fragrance or scent that masks the scent of a human being and serves to attract animals to the location of the deer lure.

PRIOR ART

A novelty search was conducted for scent devices and systems to attract wild game such as deer. The following devices were found.
A. U.S. Pat. No. 9,289,529 entitled "Animal Scent Lure Systems And Devices" and issued to Buck in 2016;
B. U.S. Pat. No. 8,938,905 entitled "Device To Attract Deer" and issued to Moore in 2015;
C. U.S. Pat. No. 8,888,550 entitled "Airborne Scent Dispensing Apparatus And System" and issued to Conner in 2014;
D. U.S. Pat. No. 7,690,540 entitled "Liquid Animal Scent Dispenser" and issued to Owens in 2010;
E. Application U.S. 2011/0278371 entitled "Wind Directed Scent Dispenser" by Rydbom in 2011;
F. Application U.S. 2008/0244954 entitled "Hunter's Scent Dispersing Apparatus" by Shannon in 2008;
G. Application U.S. 2008/0099581 entitled "Animal Scent Dispenser" by Modlin et al. in 2008;
H. Application U.S. 2006/0088500 entitled "Animal Lure Candle" by Cole in 2006;
I. U.S. Pat. No. 6,550,689 entitled "Animal Scent Dispensing Apparatus And Method Of Use" and issued to Hoyes et al. in 2003;
J. U.S. Pat. No. 6,083,804 entitled "Scent Dispenser" and issued to Cuerrier in 2000;
K. U.S. Pat. No. 5,914,119 entitled "Process And Product For Attracting Animals And Covering Human Scent" and issued to Dawson in 1999;
L. U.S. Pat. No. 5,857,281 entitled "Wild-Game Scent Dispenser" and issued to Bergquist et al. in 1999;
M. U.S. Pat. No. 5,307,584 entitled "Deer Scent Dispenser And Method" and issued to Jarvis in 1994; and
N. U.S. Pat. No. 4,953,763 entitled "Animal Scent Dispensing Apparatus" and issued to Kierum et al. in 1990.
From this search and results, as stated above and as far as known, there are no scent dispersing device and system for hunting, mosquito control, and other applications or the like. It is believed that this product is unique in its design and technologies.

Problem Solved

Prior art devices and systems have fallen short of the problems solved by the Scent dispersing device and system for hunting, mosquito control, and other applications. The improvement and problem solved as to scent dispersing devices and system is a simple, compact and safe device to provide a means to allow a game hunter to disperse a scent to attract game such as deer and the like. In addition, Attempts have been made to attract deer to more specific locations than to general locations. This system addresses the need to have a specific targeted location to attract the animals. However, other attempts include providing bait, minerals, and artificial scents to attract the deer to specific locations. These techniques can be expensive, time consuming, and may not be permitted in certain hunting jurisdictions. Likewise, some game animals are sensitive to the odor of humans. Accordingly, hunters need to disguise their scent trail. Finally, one of the problems with existing products on the market is that the smell does not carry well enough or far enough or last long enough to provide maximum beneficial effect.

SUMMARY OF THE INVENTION

This invention is a scent dispersing device and system for hunting and other applications. Taught here are the ways a scent device may provide a superior, compact and simple manner to a hunter for attracting game such as deer and the like.

The preferred embodiment of a scent dispensing device 30 and system (for hunting, mosquito control, and other applications) made of a durable, a light weight, and a fire retardant material comprised of: a top cap 32 with apertures 32A; a bottom cap 34 with apertures 34A; a main body 31 of various sizes with apertures 31; a means 36 for removably connecting main body 31 to caps 32,34; a scent stick 45 with (incense or equal) with a holder 43 and base 44; a means 40 for protecting scent stick 45; a means 33 for hanging device 30 to branches and trees; and a means 33A for removably connecting (such as loop of cord or rope, eye bolt, etc.) the hanging means 33 to top cap 32 wherein the scent stick is activated, the device is attached to the trees and the apertures of the caps and body are adjusted to cause a "chimney effect" releasing the scent from the device. An alternative embodiment of a scent dispensing device 30 and system (for hunting, mosquito control, and other applications) comprised of: a top cap 32 with apertures 32A; a bottom cap 34 with apertures 34A; a main body 31 of various sizes with apertures 31; a means 36 for removably connecting main body 31 to caps 32,34; a scent stick 45 with (incense or equal) with a holder 43 and base 44; a means 40 for protecting scent stick 45; and a means and configurations 55 for install installing dispensing device to ground 38 wherein the scent stick is activated, the device is placed onto the ground, and the apertures of the caps and body are adjusted to cause a "chimney effect" releasing the scent from the device.

The newly invented scent dispersing device and system for hunting, mosquito control, and other applications may be manufactured at low volumes by very simple means and in high volume production by more complex and controlled systems.

OBJECTS AND ADVANTAGES

There are several objects and advantages of the scent dispersing device and system for hunting, mosquito control, and other applications. There are currently no known scent dispersing device and system for hunting, mosquito control, and other applications that are effective at providing the objects of this invention.

The scent dispersing device and system for hunting, mosquito control, and other applications has various advantages and benefits:

| Item | Advantages |
| --- | --- |
| 1 | Safe/Fire resistant use of scent and fragrance stick |
| 2 | Easy dispersal for game attracting scent |
| 3 | Simple hunters means for scent sticks |
| 4 | Fire-proof or retardant scent devices |
| 5 | Dispersal means for game-attracting scents |
| 6 | Safe use device for incense sticks |
| 7 | A device with a manner to control and regulate a time and duration of the scent by an individual when waiting and making a scent trail |
| 8 | A device for dispensing animal scent which has a reservoir so as to avoid having a hunter continuously opening a commercially available package of scent to re-apply scent, while making a scent trail |
| 9 | An easy method to refresh the trail making material as required and dictated by the hunting conditions |
| 10 | An easy open and shut cap system so that no scent is released coming to and from the hunting area since the in/out apertures are controlled by the cap and secures the scent release. |
| 11 | A safe manner to disperse insect and mosquito; and controlling materials. |

Finally, other advantages and additional features of the present scent dispersing device and system for hunting, mosquito control, and other applications will be more apparent from the accompanying drawings and from the full description of the device. For one skilled in the art of game scent devices and systems, it is readily understood that the features shown in the examples with this product are readily adapted to other types of scent devices and systems.

DESCRIPTION OF THE DRAWINGS—FIGURES

The accompanying drawings, which are incorporated in and constitute a part of this specification, illustrate an embodiment of the scent dispersing device and system for hunting, mosquito control, and other applications that is preferred. The drawings together with the summary description given above and a detailed description given below serve to explain the principles of the scent dispersing device and system for hunting, mosquito control, and other applications. It is understood, however, that the scent dispersing device and system for hunting, mosquito control, and other applications is not limited to only the precise arrangements and instrumentalities shown.

FIGS. 1A through 1F are sketches of the scent dispersing device and system for hunting, mosquito control, and other applications.

FIGS. 2A through 2G are sketches of the general scent dispersing device and system (for hunting, mosquito control, and other applications) with components and features noted.

FIG. 3A through 3F are sketches of the scent dispersing device and system with the components and features shown from generally a side view.

FIGS. 4 A through 4 D are sketches of the scent dispersing device and system for hunting, mosquito control, and other applications with a transparent and camouflaged tube.

FIGS. 5 A through 5 D are sketches of the scent dispersing device and system as a smaller version for triangulating the scent.

FIGS. 6 A through 6 E are sketches of a large, ground positioned scent dispersing device and system with components and features shown.

FIGS. 7 A through 7 E are sketches of the scent dispersing device and system (for hunting, mosquito control, and other applications) as a preferred embodiment with features and components demonstrated.

FIGS. 8 A through 8 E are more sketches of the preferred scent dispersing device and system with features and components shown.

FIGS. 9 A through 9 G are sketches of the components for the preferred scent dispersing device and system.

FIGS. 10 A through 10 C are sketches of more components of the preferred scent dispersing device and system.

Figure 11:
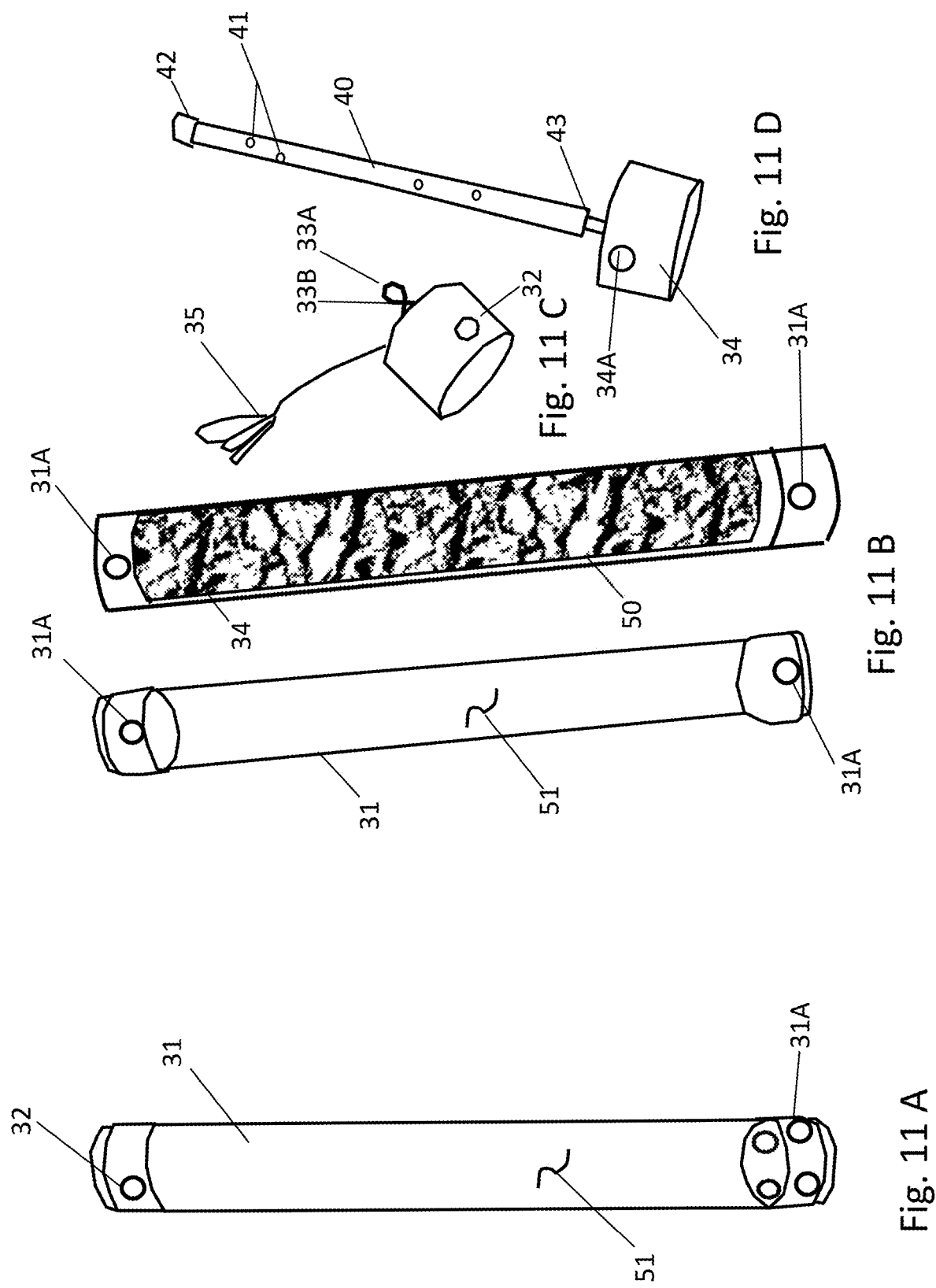

FIGS. 11 A through 11 D are sketches of the scent dispersing device and system (for hunting, mosquito control, and other applications) as a transparent and camouflaged embodiment with features and components shown.

Figure 12:
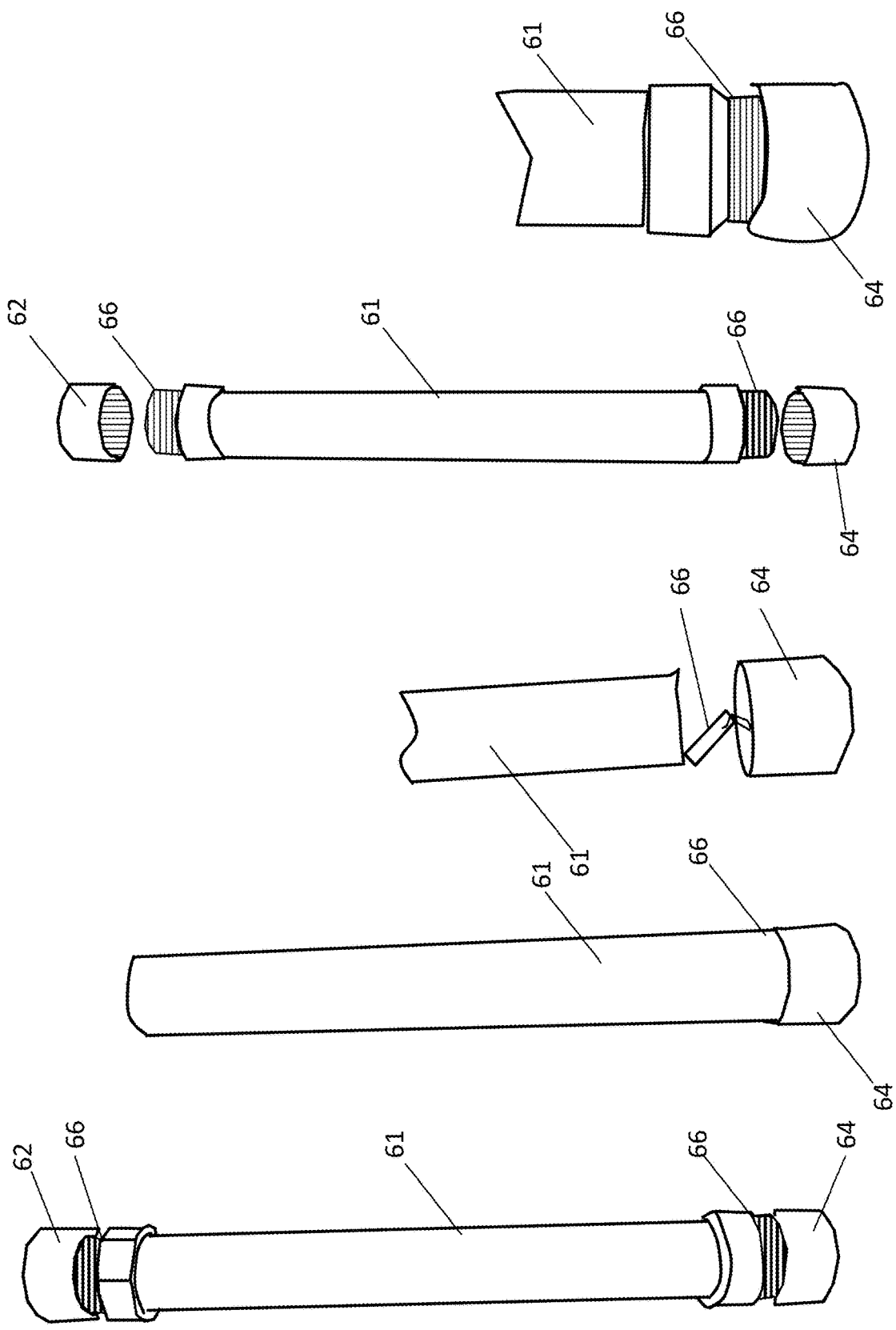

FIGS. 12 A through 12 E demonstrate common components and connecting means for the scent dispersing device and system.

FIGS. 13 A through 13 C are sketches of the small version (approximately 6 to 12 inches) of the scent dispersing device and system with components and features shown.

FIGS. 14 A through 14 E are sketches of a ground application for the scent dispersing device and system with components and features shown.

FIGS. 15 A through 15 F are sketches showing the "chimney" effect settings for operating the scent dispersing device and system (for hunting, mosquito control, and other applications).

FIGS. 16 A through 16 E are sketches of the prototype small version (approximately 6 to 12 inches) with chimney settings shown.

FIGS. 17 A through 17 D are more sketches of the prototype settings for a small version scent dispersing device and system (for hunting, mosquito control, and other applications) as shown.

FIGS. 18 A through 18 C, 19 A through 19 D and 20 A through 20 C are the scent dispersing device and system prototypes shown in the environment and trees, ready for use.

Figure 21:
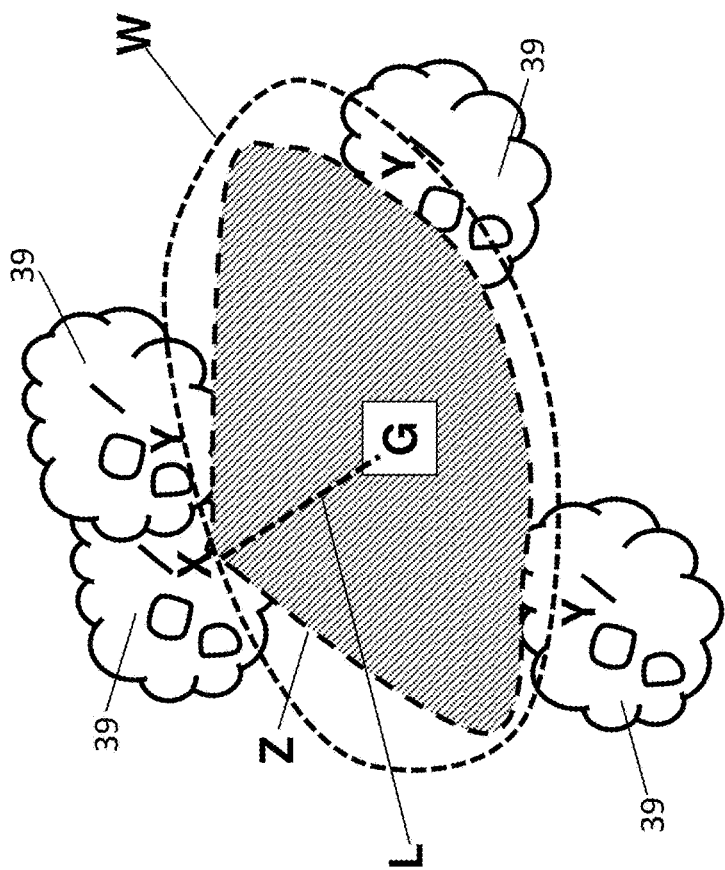

FIG. 21 is an example layout of the scent dispersing device and system (for hunting, mosquito control, and other applications).

DESCRIPTION OF THE DRAWINGS—REFERENCE NUMERALS

The following list refers to the drawings:

TABLE B

| Ref # | Description |
| --- | --- |
| | Reference numbers: |
| 30 | scent dispensing device 30 and system (for hunting, mosquito control, and other applications) whereby the normal or medium device is essentially/approximately 18 inches to two feet in length |

TABLE B-continued

| Ref # | Description |
| --- | --- |
| | Reference numbers: |
| 30A | relatively small version scent dispensing device 30A essentially approximately 6 to 12 inches and often less than one foot in length |
| 30B | relatively large scent dispensing device 30B for ground mounting essentially/approximately greater than 2 feet in length |
| 31 | main body 31 of scent dispensing device such as a hollow tube or the like |
| 31A | apertures 31A in the main body 31 |
| 31C | inner surface 31C of tube 31, 31A or 31B |
| 32 | top cap 32 for dispensing device 30 |
| 32A | apertures 32A in top cap 32 |
| 33 | removable means 33 for hanging top cap 32 and device 30, 30A |
| 33A | means 33A for removably connecting such as loop of cord or rope, eye bolt, etc. hanging means 33 to top cap 32 |
| 33B | means 33B for removably connecting loop 33A of cord or rope to top cap 32 |
| 34 | bottom cap 34 for dispensing device 30 |
| 34A | bottom cap apertures/openings 34A |
| 35 | flexible wire, cord 35 or equal for hanging loop 33A |
| 36 | means 36 for removably connecting main body 31 to caps 32, 34-press fit, threads, pins and apertures, etc. |
| 37 | stick or branch configuration 37 to match with the surrounding tree branch, bush etc. or the like |
| 38 | ground 38 |
| 39 | tree and branches 39 |
| 40 | means 40 for protecting scent stick 45 (optional) |
| 41 | apertures 41 in means for protecting 40 scent stick 45 |
| 42 | cap 42 on means for protecting 40 scent stick 45 (optional) |
| 43 | scent wire holder 43 |
| 43A | means for connecting 43A scent wire holder 43 to base 44 |
| 44 | wire base holder 44 |
| 44A | means for securing 44A base 44 to bottom cap 34 |
| 45 | scent stick 45 with (incense or equal) |
| 46 | scent material 46 (incense, or insect repellant for mosquitoes, etc.) |
| 47 | base wire 47 for scent stick 45 |
| 50 | surface finish cover 50-camouflage, clear, flower or equal |
| 51 | clear tube 51 |
| 52 | means 52 for removably hanging small dispenser 30A such as clip, carabiner, loop or equal |
| 55 | means and configurations 55 for installing dispensing device to ground 38 (any size but especially larger devices 30B) |
| 61 | common plastic (PVC, ABS, composite or the like) pipe body 61 |
| 62 | common plastic pipe top cap 62 |
| 64 | common plastic bottom cap 64 |
| 66 | means 66 for removably connecting body 61 to either top cap 62 and/or bottom cap 64 |
| 70 | aligned and open aperture 70 |
| 75 | non-aligned and closed aperture 75 |
| 77 | partially aligned and partially closed aperture 77 |
| 78 | ground stake 78 |
| 80 | Band device 80 to hold ground stake 78 to scent device 30, 30A |
| X | hunter location X |
| Y | scent dispersing device location Y |
| Z | best line of sight zone Z |
| W | clearing W in trees |
| G | curious game G |
| L | line of sight L for shot at game G |

DETAILED DESCRIPTION

This invention relates to a scent dispersing device and system for hunting, mosquito control, and other applications. This invention relates generally to animal scent lure systems and devices and, more specifically, to a scent element holder device that is used by hunters to removably secure a scent element to a hunting area, for example, to attract wild animals such as deer. The invention relates to hunting and wildlife accessories and, more particularly, to game such as deer attracting aids. In general, the present invention relates to an animal attractant and or cover scent dispersal apparatus and system associated with hunting. More particularly, the present invention relates to a new and improved animal attractant device, system and method of using the same for utilizing airborne scents to carry an animal attractant and or cover scent throughout a desired location as desired. It is understood that the current invention may also be used to disperse desired odors and or chemicals for non-hunting applications.

Use of scents while hunting is an effective way to make a hunter more successful. Scents are available commercially that attract wild game, and that mask a hunter's scent from wild game's keen sense of smell. This invention relates to hunting, mosquito control, and more particularly to a scent (animal scents or insect controlling materials) dispersing apparatus. The present invention relates to an animal scent lure and particularly to an incense that contains wild game scents such as deer estrus scent, which is released into the air by providing incense aromas, thereby a attracting a species of animal in the game and/or deer family.

The advantages for the scent dispersing device and system for hunting and other applications are listed above in the introduction. Succinctly the benefits are that the device provides:

A. A Safe/Fire resistant use of scent and fragrance stick;
B. An Easy dispersal for game attracting scent;
C. A Simple hunters means for scent sticks;
D. A Fire-proof or retardant scent devices;
E. A Dispersal means for game-attracting scents;
F. A Safe use device for incense sticks;
G. A device with a manner to control and regulate a time and duration of the scent by an individual when waiting and making a scent trail;
H. A device for dispensing animal scent which has a reservoir so as to avoid having a hunter continuously opening a commercially available package of scent to re-apply scent, while making a scent trail;
I. An easy method to refresh the trail making material as required and dictated by the hunting conditions
J. A safe manner to disperse insect and mosquito; and controlling materials.

The preferred embodiment of a scent dispensing device 30 and system (for hunting, mosquito control, and other applications) comprised of: a top cap 32 with apertures 32A; a bottom cap 34 with apertures 34A; a main body 31 of various sizes with apertures 31; a means 36 for removably connecting main body 31 to caps 32,34; a scent stick 45 with (incense or equal) with a holder 43 and base 44; a means 40 for protecting scent stick 45; a means 33 for hanging device 30 to branches and trees; and a means 33A for removably connecting (such as loop, eye bolt, etc.) the hanging means 33 to top cap 32 wherein the scent stick is activated, the device is attached to the trees and the apertures of the caps and body are adjusted to cause a "chimney effect" releasing the scent from the device. An alternative embodiment of a scent dispensing device 30 and system (for hunting and other applications) comprised of: a top cap 32 with apertures 32A; a bottom cap 34 with apertures 34A; a main body 31 of various sizes with apertures 31; a means 36 for removably connecting main body 31 to caps 32,34; a scent stick 45 with (incense or equal) with a holder 43 and base 44; a means 40 for protecting scent stick 45; and a means and configurations 55 for install installing dispensing device to ground 38 wherein the scent stick is activated, the device is placed onto the ground, and the apertures of the caps and body are adjusted to cause a "chimney effect" releasing the scent from the device.

There is shown in FIGS. 1-21 a complete description and operative embodiment of the scent dispersing device and system 30 for hunting, mosquito control, and other applications. In the drawings and illustrations, one notes well that the FIGS. 1-21 demonstrate the general configuration and use of this product. The various example uses are in the operation and use section, below.

The accompanying drawings, which are incorporated in and constitute a part of this specification, illustrate an embodiment of the scent dispersing device and system 30 for that is preferred. The drawings together with the summary description given above and a detailed description given below serve to explain the principles of the scent dispersing device and system 30 for hunting, mosquito control, and other applications. It is understood, however, that the scent dispersing device and system 30 is not limited to only the precise arrangements and instrumentalities shown. Other examples of scent dispersing devices are still understood by one skilled in the art of scent dispersal devices to be within the scope and spirit shown here.

FIGS. 1 A through 1 F are sketches of the scent dispersing device 30 and system for hunting, mosquito control, and other applications. Shown and sometimes repeated in these various views are: a normal or medium sized scent dispensing device 30 and system (for hunting, mosquito control, and other applications) essentially/approximately 18 inches to two feet in length; a relatively small version scent dispensing device 30A essentially less than one foot in length; a main body 31 of scent dispensing device such as a hollow tube or the like; apertures 31A in the main body 31; a relatively large scent dispensing device 30B for ground mounting essentially greater than 2 feet in length; a top cap 32 for dispensing device 30; apertures 32A in top cap 32; a removable means 33 for hanging top cap 32 and device 30, 30A; a bottom cap 34 for dispensing device 30; bottom cap apertures/openings 34A; flexible wire, cord 35 or equal for hanging loop 33A; ground 38; tree and branches 39; a means 40 for protecting scent stick 45; cap 42 on means for protecting 40 scent stick 45; a scent wire holder 43 scent stick 45 with (incense or equal); scent material 46 (incense, insect control etc.); and a base wire 47 for scent stick 45.

FIGS. 2 A through 2 G are sketches of the general scent dispersing device 30 and system with components and features noted. Her is seen a scent dispensing device 30 and system (for hunting, mosquito control, and other applications) essentially 18 inches to two feet in length; main body 31 of scent dispensing device such as a hollow tube or the like; apertures 31A in the main body 31; a top cap 32 for dispensing device 30; apertures 32A in top cap 32; a removable means 33 for hanging top cap 32 and device 30, 30A; a means 33A for removably connecting such as loop, eye bolt, etc. hanging means 33 to top cap 32; a bottom cap 34 for dispensing device 30; a bottom cap apertures/openings 34A; a flexible wire, cord 35 or equal for hanging loop 33A; a means 36 for removably connecting main body 31 to caps 32, 34—press fit, threads, pins and apertures, etc.; a stick or branch configuration 37 to match with the surrounding tree branch, bush etc. or the like; a means 40 for protecting scent stick 45; apertures 41 in means for protecting 40 scent stick 45; a cap 42 on means for protecting 40 scent stick 45; and a scent wire holder 43 scent stick 45 with (incense or equal). One notes that the scent stick 45 is shown as a solitary stick in FIG. 2 E while the same device has a protection sheath shown 40 in FIG. 2 F. FIG. 2 G shows the scent device with an optional stick or branch configuration 37.

FIG. 3 A through 3 F are sketches of the scent dispersing device 30 and system with the components and features shown from generally a side view. In these views, one sees demonstrated a scent dispensing device 30 and system (for hunting, mosquito control, and other applications), the normal or medium sized is approximately or essentially 18 inches to two feet in length; a main body 31 of the scent dispensing device such as a hollow tube or the like; a means 40 for protecting scent stick 45; apertures 41 in means for protecting 40 scent stick 45; a cap 42 on means for protecting 40 scent stick 45; scent wire holder 43; a means for connecting 43A scent wire holder 43 to base 44; a wire base holder 44; a means for securing 44A base 44 to bottom cap 34; a scent stick 45 with (incense or equal); scent material 46 (incense, insect control materials, etc.); and a base wire 47 for scent stick 45. One notes in FIG. 3 F, an option to hanging device 30, 30A is a Band device 80 to hold ground stake 78 to scent device 30, 30A. Also is shown the ground 38 as reference.

FIGS. 4 A through 4 D are sketches of the scent dispersing device 30 and system with a transparent and camouflaged tube. Noted in these sketches are: a main body 31 of the scent dispensing device such as a hollow tube or the like; apertures 31A in the main body 31; a top cap 32 for dispensing device 30; apertures 32A in top cap 32; a removable means 33 for hanging top cap 32 and device 30, 30A; a means 33A for removably connecting such as loop, eye bolt, etc. hanging means 33 to top cap 32; a bottom cap 34 for dispensing device 30; a flexible wire, cord 35 or equal for hanging loop 33A; a means 40 for protecting scent stick 45; a cap 42 on means for protecting 40 scent stick 45; a scent wire holder 43; a means for connecting 43A scent wire holder 43 to base 44; a wire base holder 44; a means for securing 44A base 44 to bottom cap 34; a surface finish cover 50—camouflage, clear, flower or equal; and a clear tube 51. Finish covers as examples and not as limitations include:

| Item | Tube Surface Options |
|---|---|
| 1 | Clear |
| 2 | Camouflage or simulated tree bark-painted or decal applied |
| 3 | "flowers and modern décor |
| 4 | Solid colors-painted or tinted, or powder coated |
| 5 | other |

FIGS. 5 A through 5 D are sketches of the scent dispersing device 30 and system as a smaller version for triangulating the scent. Demonstrated here are: a relatively small version scent dispensing device 30A essentially less than one foot in length; a main body 31 of the scent dispensing device such as a hollow tube or the like; apertures 31A in the main body 31; a top cap 32 for dispensing device 30; apertures 32A in top cap 32; a removable means 33 for hanging top cap 32 and device 30, 30A; a means 33A for removably connecting such as loop, eye bolt, etc. hanging means 33 to top cap 32; a bottom cap 34 for dispensing device 30; bottom cap apertures/openings 34A; a stick or branch configuration 37 to match with the surrounding tree branch, bush etc. or the like; a scent wire holder 43; and a means 52 for removably hanging small dispenser 30A such as clip, carabiner, loop or equal.

FIGS. 6 A through 6 E are sketches of a large, ground positioned scent dispersing device 30B and system (for hunting, mosquito control, and other applications) with components and features shown. In these sketches are portrayed: a relatively large scent dispensing device 30B for ground mounting (approximately or essentially greater than 2 feet in length); a main body 31 of the scent dispensing device such as a hollow tube or the like; apertures 31A in the main body 31; an inner surface 31C of tube 31, 31A or 31B; a top cap 32 for dispensing device 30; a removable means 33 for hanging top cap 32 and device 30, 30A; a means 33A for removably connecting such as loop, eye bolt, etc. hanging means 33 to top cap 32; a means 33B for removably connecting loop 33A to top cap 32; a wire base holder 44; a scent stick 45 with (incense or equal); a means 52 for removably hanging small dispenser 30A such as clip, carabiner, loop or equal; and a means and configurations 55 for install installing large dispensing device 30B to ground 38.

FIGS. 7 A through 7 E are sketches of the scent dispersing device 30 and system as a preferred embodiment with features and components demonstrated. Viewed here are: a main body 31 of scent dispensing device such as a hollow tube or the like; apertures 31A in the main body 31; a top cap 32 for dispensing device 30; apertures 32A in top cap 32; a removable means 33 for hanging top cap 32 and device 30, 30A; a means 33A for removably connecting such as loop, eye bolt, etc.; a hanging means 33 to top cap 32; a means 33B for removably connecting loop 33A to top cap 32; a bottom cap 34 for dispensing device 30; bottom cap apertures/openings 34A; a flexible wire, cord 35 or equal for hanging loop 33A; a means 36 for removably connecting main body 31 to caps 32,34—press fit, threads, pins and apertures, etc.; a means 40 for protecting scent stick 45; and a surface finish cover 50—camouflage, clear, flower or equal.

FIGS. 8 A through 8 E are more sketches of the preferred scent dispersing device 30 and system (for hunting, mosquito control, and other applications) with features and components shown. In these sketches are repeated views of the main body 31 of scent dispensing device such as a hollow tube or the like; apertures 31A in the main body 31; a top cap 32 for dispensing device 30; apertures 32A in top cap 32; a removable means 33 for hanging top cap 32 and device 30, 30A; a means 33A for removably connecting such as loop, eye bolt, etc. hanging means 33 to top cap 32; a bottom cap 34 for dispensing device 30; bottom cap apertures/openings 34A; a flexible wire, cord 35 or equal for hanging loop 33A; a cap 42 on means for protecting 40 scent stick 45; a scent wire holder 43; and surface finish cover 50—camouflage, clear, flower or equal. One notes in FIG. 8 A, an option to hanging device 30, 30A is a Band device 80 to hold ground stake 78 to scent device 30, 30A. Also is shown the ground 38 as reference.

FIGS. 9A through 9 G are sketches of the components for the preferred scent dispersing device and system (for hunting, mosquito control, and other applications). Sketches here show: a main body 31 of the scent dispensing device such as a hollow tube or the like; apertures 31A in the main body 31; a top cap 32 for dispensing device 30; apertures 32A in top cap 32; a removable means 33 for hanging top cap 32 and device 30, 30A; a means 33A for removably connecting such as loop, eye bolt, etc. hanging means 33 to top cap 32; a means 33B for removably connecting loop 33A to top cap 32; a bottom cap 34 for dispensing device 30; a bottom cap apertures/Non-Provisional openings 34A; a flexible wire, cord 35 or equal for hanging loop 33A; a means 40 for protecting scent stick 45; apertures 41 in means for protecting 40 scent stick 45; a cap 42 on means for protecting 40 scent stick 45; a scent wire holder 43; a means for connecting 43 A scent wire holder 43 to base 44; a wire base holder 44; a means for securing 44A base 44 to bottom cap 34; a scent stick 45 with (incense or equal); scent material 46 (incense, insect control materials etc.); a base wire 47 for scent stick 45; and a surface finish cover 50—camouflage, clear, flower or equal. Tube surface finish options include: Clear; Camouflage or simulated tree bark—painted or decal applied; flowers and modern décor; Solid colors—painted or tinted, or powder coated; and other.

FIGS. 10 A through 10 C are sketches of more components of the preferred scent dispersing device 30 and system. These sketches portray the scent stick and components. Shown are: a bottom cap 34 for dispensing device 30; bottom cap apertures/openings 34A; a means 40 for protecting scent stick 45; a cap 42 on means for protecting 40 scent stick 45; a scent wire holder 43; a means for connecting 43A scent wire holder 43 to base 44; a wire base holder 44; a means for securing 44A base 44 to bottom cap 34; a scent stick 45 with (incense or equal); scent material 46 (incense, or insect repellant for mosquitoes, etc.); and a base wire 47 for scent stick 45.

FIGS. 11 A through 11 D are sketches of the scent dispersing device 30 and system as a transparent and camouflaged embodiment with features and components shown. Here one views: a main body 31 of scent dispensing device such as a hollow tube or the like; apertures 31A in the main body 31; a top cap 32 for dispensing device 30; a removable means 33 for hanging top cap 32 and device 30, 30A; a means 33A for removably connecting such as loop, eye bolt, etc.; a hanging means 33 to top cap 32; a means 33B for removably connecting loop 33A to top cap 32; a bottom cap 34 for dispensing device 30; bottom cap apertures/openings 34A; a flexible wire, cord 35 or equal for hanging loop 33A; a means 40 for protecting scent stick 45; apertures 41 in means for protecting 40 scent stick 45; a cap 42 on means for protecting 40 scent stick 45; a scent wire holder 43; a surface finish cover 50—camouflage, clear, flower or equal; and a clear/translucent tube 51.

FIGS. 12 A through 12 E demonstrate common components and connecting means for the scent dispersing device 30 and system (for hunting, mosquito control, and other applications). Demonstrated here are: a common plastic (PVC, ABS, composite or the like) pipe body 61; a common plastic pipe top cap 62; a common plastic bottom cap 64; and a means 66 for removably connecting body 61 to either top cap 62 and/or bottom cap 64. The various connection means are for example and not as a limitation:

| Item | Connection Means |
|---|---|
| 1 | Snug Fit/Press Fit |
| 2 | Threaded connections |
| 3 | Pins and apertures |
| 4 | Tabs and Slots |
| 5 | Fasteners |

FIGS. 13 A through 13 C are sketches of the small version 30A of the scent dispersing device 30 and system (for hunting, mosquito control, and other applications) with components and features shown. In these sketches are shown: a main body 31 of a scent dispensing device such as a hollow tube or the like; apertures 31A in the main body 31; a top cap 32 for dispensing device 30; apertures 32A in top cap 32; a removable means 33 for hanging top cap 32 and device 30, 30A; a means 33A for removably connecting such as loop, eye bolt, etc.; a hanging means 33 to top cap 32; a bottom cap 34 for dispensing device 30; bottom cap apertures/openings 34A; and a means 52 for removably hanging small dispenser 30A such as clip, carabiner, loop or equal.

FIGS. 14 A through 14 E are sketches of a ground application 30B for the scent dispersing device 30 and system with components and features shown. In this set of sketches are shown: a relatively large scent dispensing device 30B for ground mounting essentially greater than 2 feet in length; a main body 31 of scent dispensing device such as a hollow tube or the like; apertures 31A in the main body 31; an inner surface 31C of tube 31, 31A or 31B; a top cap 32 for dispensing device 30; a removable means 33 for hanging top cap 32 and device 30, 30A; a means 33A for removably connecting such as loop, eye bolt, etc.; a hanging means 33 to top cap 32; a means 33B for removably connecting loop 33A to top cap 32; a wire base holder 44; a scent stick 45 with (incense or equal); and a means and configuration 55 for installing large devices to the ground such as stakes, rebar, fence posts, stumps, and the like.

The scent dispensing device 30 and system (for hunting and other applications) anticipates being produced from a plethora, yet primarily as a plastic product. The material must be durable, light weight, and fire retardant. For example and not as a limitation to the scope and spirit of this device, the material can be plastic—PVC, CPVC, ABS, Acrylic, Urethane or Polyurethane, etc. These plastics can be resins or also encapsulated with strengthening such as nylon and fiberglass particles or meshes. This material can be a composite material. It can be pressed fiber board. Likewise, the device could be a thin stamped or cast metal. In all types, the surface may be transparent, translucent or with a surface finish such as camouflage or solid colors.

FIGS. 15 A through 15 F are sketches showing the "chimney" effect settings for operating the scent dispersing device and system (for hunting, mosquito control, and other applications). FIGS. 16 A through 16 E are sketches of the prototype small version with chimney settings shown. FIGS. 17 A through 17 D are more sketches of the prototype settings for a small version scent dispersing device and system (for hunting and other applications) as shown. FIGS. 18 A through 18 C, 19 A through 19 D and 20 A through 20 C are the scent dispersing device and system (for hunting, mosquito control, and other applications) prototypes shown in the environment and trees, ready for use. FIG. 21 is an example layout of the scent dispersing device and system. FIGS. 15 through 21 are shown below in the explanation of how the scent dispersing device and system 30 for hunting and other applications operates and is used in the field by hunters.

The details mentioned here are exemplary and not limiting. Other specific components and manners specific to describing a scent dispersing device and system 30 for may be added as a person having ordinary skill in the field of the art of game and hunting scent devices, insect control, and systems and their uses well appreciates.

Operation of the Preferred Embodiment

The scent dispersing device and system for hunting and other applications 30 has been described in the above embodiment. The manner of how the device operates is described below. One notes well that the description above and the operation described here must be taken together to fully illustrate the concept of the scent dispersing device and system for hunting, mosquito control, and other applications 30. The preferred embodiment of a scent dispensing device 30 and system (for hunting, mosquito control, and other applications) comprised of: a top cap 32 with apertures 32A;

a bottom cap 34 with apertures 34A; a main body 31 of various sizes with apertures 31; a means 36 for removably connecting main body 31 to caps 32,34; a scent stick 45 with (incense or equal) with a holder 43 and base 44; a means 40 for protecting scent stick 45; a means 33 for hanging device 30 to branches and trees; and a means 33A for removably connecting (such as loop, eye bolt, etc.) the hanging means 33 to top cap 32 wherein the scent stick is activated, the device is attached to the trees and the apertures of the caps and body are adjusted to cause a "chimney effect" releasing the scent from the device. An alternative embodiment of a scent dispensing device 30 and system (for hunting and other applications) comprised of: a top cap 32 with apertures 32A; a bottom cap 34 with apertures 34A; a main body 31 of various sizes with apertures 31; a means 36 for removably connecting main body 31 to caps 32,34; a scent stick 45 with (incense or equal) with a holder 43 and base 44; a means 40 for protecting scent stick 45; and a means and configurations 55 for install installing dispensing device to ground 38 wherein the scent stick is activated, the device is placed onto the ground, and the apertures of the caps and body are adjusted to cause a "chimney effect" releasing the scent from the device.

The scent dispersing device 30 and system for hunting and other applications operates to provide a simple means to have a game attracting device near a hunting area. As stated previously there are a scent dispensing device 30 and system (for hunting and other applications) essentially 18 inches to two feet in length; relatively small version of a scent dispensing device 30A essentially less than one foot in length; and a relatively large scent dispensing device 30B for ground mounting essentially greater than 2 feet in length. Each device has a body 31, top cap 32 and bottom cap 34. These all have apertures for aligning as described below in Paragraph The manner or way to operate the scent dispensing device 30 is similar regardless of the size.

| Step | Action |
|---|---|
| 1 | Select type of devices, number to deploy and relative location |
| | For each device: |
| 2 | Align apertures 32A and upper apertures 31A to be open 70 |
| 3 | Align apertures 34A and lower apertures 31A to be open 70 |
| 4 | Remove bottom cap 34 |
| 5 | Place scent stick 45 in holder 43 |
| 6 | Light scent stick 45 (or open the pouch to activate a pre-soaked rag) |
| 7 | Secure bottom cap 34 to body 31 |
| 8 | Hang device 30 by the hanging means 33, 52 from a branch or tree 39 OR place onto the ground 38 using the means and configurations 55 for installing a device 30 to ground 38 |
| 9 | Adjust apertures 32A and upper apertures 31A to be open 70 to create desired chimney effect |
| 10 | Adjust apertures 34A and lower apertures 31A to be open 70 to create desired chimney effect |
| 11 | Repeat Steps 2 through 11 for each device |
| 12 | Hunt game or use device 30 as desired if not for hunting |
| 13 | Misalign apertures 32A and upper apertures 31A to be closed 75 to remove air to smoldering stick 45 and shut down scent and chimney effect |
| 14 | Misalign apertures 34A and lower apertures 31A to be closed 75 to remove air to smoldering stick 45 and shut down scent and chimney effect |
| 15 | Remove devices 30 from area |
| 16 | Store devices in safe location |

There are other uses for this device other than as a hunting scent dispersing device. For example and not as a limitation:

| No. | Use |
|---|---|
| 1 | Inside incense hanging device |
| 2 | Area yard treatment for insects (mosquitos, flies, ticks, gnats, bees, wasps etc.) with scents like citronella of the like |
| 3 | Area yard treatment for aromatic scents for gatherings or parties |
| 4 | Inside and outside air fresheners |
| 5 | Area yard treatment for rodent repellent safe from domestic pets |

An important feature and advantage is that the scent devices 30A, 30B and 30C all have an easy open and shut cap system so that no scent is released coming to and from the hunting area since the in/out apertures are controlled by the cap and secures the scent release. Therefore, after leaving a hunted area, no scent remains and provides a fresh approach the next day or next time approaching and using the hunting area.

FIGS. 15 A through 15 F are sketches showing the "chimney" effect settings for operating the scent dispersing device and system (for hunting and other applications). Here is shown the relatively small version of the scent dispensing device 30A essentially less than one foot in length; the main body 31 of the scent dispensing device such as a hollow tube or the like; apertures 31A in the main body 31; an inner surface 31C of tube 31, 31A or 31B; a top cap 32 for dispensing device 30; the removable means 33 for hanging top cap 32 and device 30, 30A; the means 33A for removably connecting such as loop, eye bolt, etc. hanging means 33 to top cap 32; the means 52 for removably hanging small dispenser 30A such as clip, carabiner, loop or equal; and the aligned and open aperture 70 plus the non-aligned and closed aperture 75. The apertures 70, 75 indicate the condition of the inner device being exposed to the outer atmosphere. As the incense or scent stick 45 simmers and "burns" the air comes in from the lower apertures formed by the apertures 34A in the bottom cap 34 and lower apertures 31A in the body 31. Depending on of these apertures are closed 75 (non-aligned), partially open 77 or open 70 (aligned), none, some or a full air stream may enter the apertures at the bottom of the device 30.

A very similar phenomena happens at the top of the device 30. As the incense or scent stick 45 simmers and "burns" the air rises with the heat and tries to exit the inner chamber to the atmosphere through the upper apertures formed by the apertures 32A in the top cap 32 and upper apertures 31A in the body 31. Depending on of these apertures are closed 75 (non-aligned), partially open 77 or open 70 (aligned), none, some or a full air stream may exit the apertures at the top of the device 30. Finally, the alignment of the apertures 32A, upper 31A in the top cap 34 and body 31, as well as the alignment of the apertures 34A, lower 31A in the bottom cap 34 and body 31 can be easily adjusted to a desired state. The caps 32, 34 are merely individually rotated about the main body. Thereby the degree of alignment or non-alignment of top cap 32 apertures 32A and upper apertures 31A of the body 31A result in open 70, closed 75 or a partially open 77 condition at the top of the device 30. Likewise the degree of alignment or non-alignment of bottom cap 34 apertures 34A and lower apertures 31A of the body 31A result in open 70, closed 75 or a partially open 77 condition at the bottom of the device 30. One skilled in the art of thermal events such as fire and smoldering fire (with smoke) fully understands that this is the chimney effect of hot air rising. The amount in this device 30 is controlled at the top and bottom by controlling the amount of the respective apertures being open 70, closed 75 or a partially open 77 condition at the bottom of the device 30.

Mosquito-borne diseases or mosquito-borne illnesses are diseases caused by bacterial, viruses or parasites transmitted by mosquitoes. They can transmit disease without being affected themselves. Diseases transmitted by mosquitoes include: malaria, West Nile virus, yellow fever, various forms of encephalitis, and Zika virus and fever. The area yard treatment for insects (mosquitos, flies, ticks, gnats, bees, wasps, etc.) with scents like citronella of the like is one specific use of the Scent dispersing device and system for hunting, mosquito control, and other applications. This device provides a safe manner to disperse insect and mosquito; and controlling materials. The various sized device, the ability to place as a device hanging from trees and bushes, and the ability to place the scent device on stakes mounted to the ground provides optimum ways to use insect and mosquito control scents and materials. With the outbreak of the Zika virus and those listed above, this device can provide a needed approach to control this and other health menaces.

FIGS. 16 A through 16 E are sketches of the prototype small version with chimney settings shown. Shown here are the main body 31 of the scent dispensing device such as a hollow tube or the like; apertures 31A in the main body 31; a top cap 32 for dispensing device 30; apertures 32A in top cap 32; aligned and open aperture 70; non-aligned and closed aperture 75; and partially aligned and partially closed aperture 77. The operation and adjustment of the apertures creating the chimney effect is very similar to that described in the previous paragraph.

FIGS. 17 A through 17 D are more sketches of the prototype settings for a small version scent dispersing device and system (for hunting and other applications) as shown. Demonstrated in these sketches are the relatively small version scent dispensing device 30A essentially less than one foot in length; the main body 31 of the scent dispensing device such as a hollow tube or the like; apertures 31A in the main body 31; a top cap 32 for dispensing device 30; apertures 32A in top cap 32; a bottom cap 34 for dispensing device 30; bottom cap apertures/openings 34A; a means 52 for removably hanging small dispenser 30 A such as clip, carabiner, loop or equal; and the aligned and open aperture 70, non-aligned and closed aperture 75, and partially aligned and partially closed aperture 77. The operation and adjustment of the apertures creating the chimney effect is very similar to that described in the above paragraph [0075].

Figure 19:
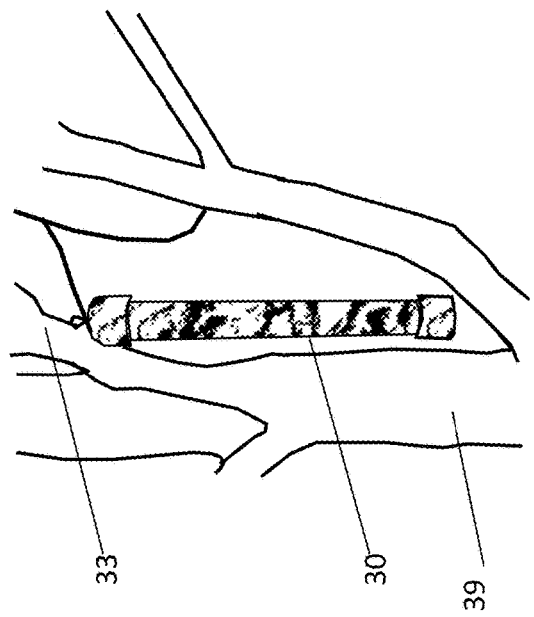
Figure 19:
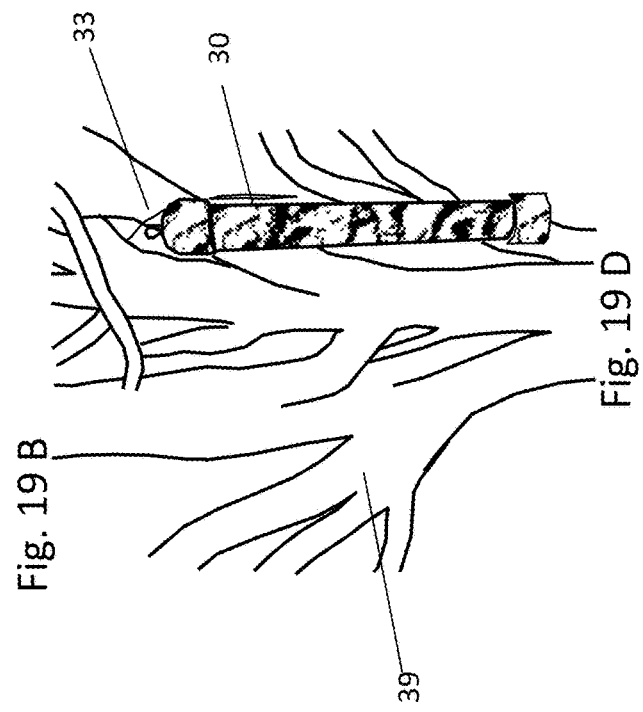
Figure 19:
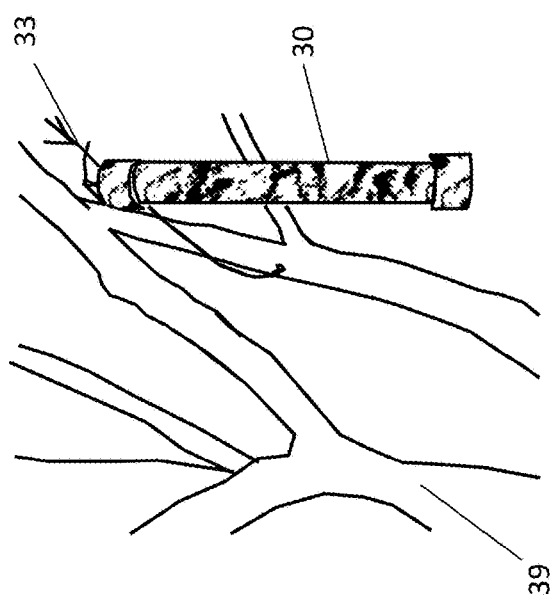
Figure 19:
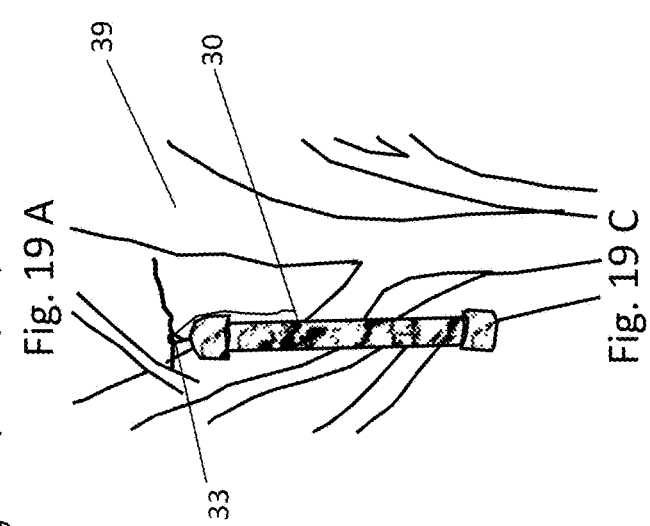

FIGS. 18 A through 18 C, 19 A through 19 D and 20 A through 20 C are the scent dispersing device and system (for hunting, mosquito control, and other applications) prototypes shown in the environment and trees, ready for use. In FIG. 18 are shown: a relatively large scent dispersing device 30B for ground mounting essentially greater than 2 feet in length; the ground 38; and tree and branches 39. In FIG. 19 are shown: a scent dispersing device 30 and system (for hunting and other applications) essentially 18 inches to two feet in length; a removable means 33 for hanging top cap 32 and device 30, 30A; and the tree and branches 39. In FIG. 20 are shown: a relatively small version of the scent dispensing device 30A essentially less than one foot in length; the tree and branches 39; a means 52 for removably hanging small dispenser 30A such as clip, carabiner, loop or equal.

FIG. 21 is an example layout of the scent dispersing device and system. Here are shown: tree and branches 39; hunter location X; scent dispersing device location Y; best line of sight Z; clearing W in trees; and curious game G. The scent devices 30 are placed at predetermined locations Y. Often 3 or more devices 30 are placed to triangulate or create a virtual "envelope" of scent to entice curious game G such as a deer of other game mammals. This envelope is also placed where the hunter at his/her location X can have a clear or best line of sight zone Z at the curious game G and specific line of sight L for shot at game G. This quite often is in a clearing W of the trees or bush.

With this description it is to be understood that the scent dispersing device and system 30 for hunting, mosquito control, and other applications is not to be limited to only the disclosed embodiment of product. The features of the scent dispersing device and system 30 are intended to cover various modifications and equivalent arrangements included within the spirit and scope of the description.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described above in the foregoing paragraphs.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

The terms recited in the claims should be given their ordinary and customary meaning as determined by reference to relevant entries (e.g., definition of "plane" as a carpenter's tool would not be relevant to the use of the term "plane"

when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. Accordingly, the subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques.

What is claimed is:

1. A scent dispensing device (30), for game attracting, insect and mosquito control, and other various uses, made of a durable, light weight, and fire-retardant material and comprised of:
   a top cap (32) with apertures (32A);
   a bottom cap (34) with apertures (34A) the cap (34) located at an end opposite the top cap (32);
   a main body (31) with apertures (31A) at both ends of the main body;
   a means (36) for removably connecting the main body (31) to the top and bottom caps (32,34) and for rotatably adjusting alignment of the apertures (31A, 32A, 34A);
   a surface finish for the top cap, the main body and the bottom cap;
   a scent stick (45) with a holder (43) and a base (44) with a means (44A) for securing the base (44) to the bottom cap (34) and in turn a means (43A) for connecting the holder (43) to the base (44);
   a tube/sheath (40) with apertures (41) and a cap (42), the tube/sheath (40) being press fitted over the holder (43) whereby the tube/sheath (40) protects the scent stick (45);
   a means (33) for hanging the scent dispensing device (30) to branches and trees; and
   a means (33A) for removably connecting the hanging means (33) to the top cap (32);
   wherein the scent stick is activated, the scent dispensing device is attached to a tree and the apertures (31A, 32A, 34A) of the top and bottom caps and the main body are variably adjusted from totally opened to totally closed to cause and to control a "chimney effect" releasing the scent from the scent dispensing device.

2. The scent dispensing device (30) according to claim 1 wherein the durable, light weight, and fire-retardant material is selected from the group consisting of plastic, polyvinyl chloride (PVC), chlorinated polyvinyl chloride (CPVC), Acrylonitrile butadiene styrene (ABS), Acrylic, Urethane, Polyurethane, composite material, fire retardant pressed fiber board, thin stamped metal, and thin cast metal.

3. The scent dispensing device (30) according to claim 1 wherein the scent dispensing device is configured in a size selected from the group consisting of a medium size essentially and approximately 18 inches to two feet in length; a small size essentially and approximately 6 to 12 inches; and a large size essentially and approximately greater than 2 feet in length.

4. The scent dispensing device (30) according to claim 1 wherein the means (36) for removably connecting the main body (31) to the top and bottom caps (32, 34) is selected from the group consisting of a snug fit; a press fit; pins and apertures; threaded connections; tabs and slots; and fasteners.

5. The scent dispensing device (30) according to claim 1 wherein the various uses are selected from the group consisting of an inside incense hanging device; and area yard treatment for mosquitos, flies, ticks, bees, gnats, and wasps; an area yard treatment for aromatic scents; an inside and outside air freshener; and an area yard treatment for rodent repellent safe for domestic pets.

6. The scent dispensing device (30) according to claim 1 wherein the means for removably connecting the hanging means of the scent dispensing device to a tree is selected from the group consisting of a loop of cord, an eye bolt, a clip, and a carabiner.

7. The scent dispensing device (30) according to claim 1 wherein the surface finish is selected from the group consisting of a clear and transparent smooth finish; a camouflage; a simulated tree bark decal; a flower; a modern décor; and a solid color.

8. A scent dispensing device (30) for game attracting, insect and mosquito control and other various uses, made of a durable, light weight, and fire-retardant material and comprised of:
   a top cap (32) with apertures (32A);
   a bottom cap (34) with apertures (34A) the cap (34) located at an end opposite the top cap (32);
   a main body (31) with apertures (31A) at both ends of the main body;
   a means (36) for removably connecting the main body (31) to the top and bottom caps (32,34) and for rotatably adjusting alignment of the apertures (31A, 32A, 34A);
   a surface finish for the top cap, the main body and the bottom cap;
   a scent stick (45) with a holder (43) and a base (44) with a means (44A) for securing the base (44) to the bottom cap (34) and in turn a means (43A) for connecting the holder (43) to the base (44);

a tube/sheath (40) with apertures (41) and a cap (42), the tube/sheath (40) being press fitted over the holder (43) whereby the tube/sheath (40) protects the scent stick (45);

a means and configuration (55) for installing the scent dispensing device to ground (38);

wherein the scent stick is activated, the scent dispensing device is attached to a tree and the apertures (31A, 32A, 34A) of the top and bottom caps and the main body are variably adjusted from totally opened to totally closed to cause and to control a "chimney effect" releasing the scent from the scent dispensing device.

9. The scent dispensing device (30) according to claim 8 wherein the durable, light weight, and fire-retardant material is selected from the group consisting of plastic, polyvinyl chloride (PVC), chlorinated polyvinyl chloride (CPVC), Acrylonitrile butadiene styrene (ABS), Acrylic, Urethane, Polyurethane, composite material, fire retardant pressed fiber board, thin stamped metal, and thin cast metal.

10. The scent dispensing device (30) according to claim 8 wherein the scent dispensing device is configured in a size selected from the group consisting of a medium size essentially and approximately 18 inches to two feet in length; a small size essentially and approximately 6 to 12 inches; and a large size essentially and approximately greater than 2 feet in length.

11. The scent dispensing device (30) according to claim 8 wherein the means (36) for removably connecting the main body (31) to the top and bottom caps (32,34) is selected from the group consisting of a snug fit; a press fit; pins and apertures; threaded connections; tabs and slots; and fasteners.

12. The scent dispensing device (30) according to claim 8 wherein the various uses are selected from the group consisting of an inside incense hanging device; and area yard treatment for mosquitos, flies, ticks, bees, wasps, and gnats; an area yard treatment for aromatic scents; an inside and outside air freshener; and an area yard treatment for rodent repellent safe for domestic pets.

13. The scent dispensing device (30) according to claim 8 wherein the means and configuration (55) for installing the scent dispensing device to ground is selected from the group consisting of a stake, a rebar, a fence post, and a stump.

14. The scent dispensing device (30) according to claim 8 wherein the surface finish is selected from the group consisting of a clear and transparent smooth finish; a camouflage; a simulated tree bark decal; a flower; a modern décor; and a solid color.

15. The finishes in claim 14 wherein the surface finish is applied by a means selected from a group consisting of integrally applied; painted; decal; and powder coated.

* * * * *